US008118654B1

(12) United States Patent
Nicolas et al.

(10) Patent No.: US 8,118,654 B1
(45) Date of Patent: Feb. 21, 2012

(54) FINANCIAL GAME WITH COMBINED ASSETS

(76) Inventors: Jean-Francois Pascal Nicolas, Marly-le-Roi (FR); Jean Luc Cadranel, Le Pecq (FR)

( * ) Notice: Subject to any disclaimer, the term of this patent is extended or adjusted under 35 U.S.C. 154(b) by 996 days.

(21) Appl. No.: 12/003,394

(22) Filed: Dec. 26, 2007

Related U.S. Application Data

(60) Provisional application No. 60/877,101, filed on Dec. 26, 2006.

(51) Int. Cl.
*A63F 9/24* (2006.01)
*G06Q 40/00* (2006.01)
(52) U.S. Cl. .............. 463/9; 463/1; 705/35; 705/36 R; 705/37
(58) Field of Classification Search .............. 463/1, 9; 705/36 R, 37, 35
See application file for complete search history.

(56) References Cited

U.S. PATENT DOCUMENTS

| | | | | | |
|---|---|---|---|---|---|
| 4,363,489 | A | * | 12/1982 | Chodak et al. ............... 273/237 |
| 5,713,793 | A | * | 2/1998 | Holte ........................ 463/25 |
| 5,842,921 | A | * | 12/1998 | Mindes et al. ............... 463/16 |
| 6,061,662 | A | * | 5/2000 | Makivic .................... 705/36 R |
| 6,126,543 | A | * | 10/2000 | Friedman .................... 463/16 |
| 6,236,900 | B1 | * | 5/2001 | Geiger ........................ 700/91 |
| 6,321,212 | B1 | * | 11/2001 | Lange ...................... 705/36 R |
| 6,381,586 | B1 | * | 4/2002 | Glasserman et al. ........ 705/36 R |
| 6,473,084 | B1 | * | 10/2002 | Phillips et al. ................ 345/440 |
| 6,606,615 | B1 | * | 8/2003 | Jennings et al. ............... 706/45 |
| 6,681,211 | B1 | * | 1/2004 | Gatto ........................ 705/36 R |
| 6,688,978 | B1 | * | 2/2004 | Herman ..................... 463/25 |
| 6,709,330 | B1 | * | 3/2004 | Klein et al. ................. 463/9 |
| 6,910,965 | B2 | * | 6/2005 | Downes ..................... 463/28 |
| 7,024,384 | B2 | * | 4/2006 | Daughtery, III .......... 705/36 R |
| 7,040,982 | B1 | * | 5/2006 | Jarvis et al. ................. 463/9 |
| 7,072,863 | B1 | * | 7/2006 | Phillips et al. ............. 705/36 R |
| 7,206,762 | B2 | * | 4/2007 | Sireau ....................... 705/37 |
| 7,212,998 | B1 | * | 5/2007 | Muller et al. .............. 705/36 R |
| 7,233,922 | B2 | * | 6/2007 | Asher et al. ............... 705/36 R |
| 7,236,953 | B1 | * | 6/2007 | Cooper et al. ............. 705/36 R |
| 7,338,360 | B2 | * | 3/2008 | Jarvis et al. ................. 463/9 |
| 7,359,876 | B1 | * | 4/2008 | Redpath et al. ............. 705/37 |
| 7,386,500 | B1 | * | 6/2008 | Payne ........................ 705/37 |
| 7,451,213 | B2 | * | 11/2008 | Kaplan ...................... 709/224 |
| 7,542,937 | B1 | * | 6/2009 | Cohen ........................ 705/37 |
| 7,563,162 | B2 | * | 7/2009 | Lawson et al. .............. 463/16 |
| 7,711,628 | B2 | * | 5/2010 | Davie et al. .................. 705/37 |
| 7,769,661 | B1 | * | 8/2010 | Joss ......................... 705/36 R |
| 7,783,552 | B2 | * | 8/2010 | Assia et al. ................ 705/36 R |
| 7,797,215 | B1 | * | 9/2010 | Zerenner et al. ............ 705/36 R |
| 7,946,922 | B2 | * | 5/2011 | Yin ........................... 463/42 |
| 7,962,400 | B2 | * | 6/2011 | Amaitis et al. ............... 705/37 |
| 2001/0056391 | A1 | * | 12/2001 | Schultz ...................... 705/36 |
| 2002/0073007 | A1 | * | 6/2002 | Ayache ...................... 705/36 |
| 2002/0099640 | A1 | * | 7/2002 | Lange ........................ 705/37 |
| 2002/0120542 | A1 | * | 8/2002 | Higgins ...................... 705/36 |
| 2003/0004748 | A1 | * | 1/2003 | Coleman et al. ............... 705/1 |
| 2003/0144947 | A1 | * | 7/2003 | Payne ........................ 705/37 |
| 2004/0024677 | A1 | * | 2/2004 | Wallman ..................... 705/36 |
| 2004/0199442 | A1 | * | 10/2004 | Haberle ....................... 705/35 |
| 2005/0197948 | A1 | * | 9/2005 | Davie et al. .................. 705/37 |
| 2005/0208996 | A1 | * | 9/2005 | Friedman .................... 463/25 |
| 2006/0082061 | A1 | * | 4/2006 | Kertcher ..................... 273/256 |
| 2006/0199631 | A1 | * | 9/2006 | McGill et al. ................ 463/16 |
| 2007/0087819 | A1 | * | 4/2007 | Van Luchene et al. ........ 463/25 |
| 2007/0099685 | A1 | * | 5/2007 | Van Luchene ................. 463/1 |
| 2008/0027880 | A1 | * | 1/2008 | Yu ........................... 705/36 R |

OTHER PUBLICATIONS

"Virtual Trader" retrieved and printed from http://web.archive.org/web/20041207220409/virtualtrader.co.uk/default.asp and available on or before Dec. 7, 2004, 4 pages.*
"Characteristics and Risks of Standardized Options," published by American Stock Exchange, Inc., et al., retrieved and printed from http://www.cboe.com/LearnCenter/pdf/characteristicsandrisks.pdf, available on or before Dec. 31, 2005, 60 pages.*
"Pricing American-style Basket Options by Implied Binomial Tree," written by Henry Wan, retrieved and printed from "http://www.haas.berkeley.edu/MFE/download/student_papers/mfe02_wan-pricing_basket_options.pdf" and available on or before Mar. 31, 2002, 34 pages.*
"Michigan's Club Keno: The Odds and the Reality" written by Jon Boland, retrieved and printed from http://gregdooley.com/archive05/0417Keno_breakdown.html, available on or before Apr. 17, 2005, 3 pages.*

* cited by examiner

*Primary Examiner* — Dmitry Suhol
*Assistant Examiner* — Jason Skaarup

(57) ABSTRACT

The disclosure includes a method for a financial forecasting game wherein players can take positions on specific very high leverage option-type products. It includes related mathematical modeling methods which can be used to operate these option-type products under the form of a game. It includes, namely, methods to determine probability laws, validate and optimise models, calculate risks, measure individual performance, use steering variables such as tolerance margins and volatility-driven point values. It includes, as a specific application, detailed mathematical formulas to operate the game with three market indexes.

33 Claims, No Drawings

FINANCIAL GAME WITH COMBINED ASSETS

CROSS-REFERENCE TO RELATED APPLICATIONS

This application claims benefit of provisional Application 60/877,101, Dec. 26, 2006

STATEMENT REGARDING FEDERALLY SPONSORED RESEARCH OR DEVELOPMENT

Not applicable.

REFERENCE TO SEQUENCE LISTING, A TABLE, OR A COMPUTER LISTING COMPACT DISK APPENDIX

Not applicable.

BACKGROUND OF THE INVENTION

1. Field of the Invention

The present invention relates generally to four several fields: games, education, finance and modeling. More particularly, the present invention relates to a financial forecasting game and the financial methods and mathematical models elaborated therefore and the applications of those to the finance field. Concerning the games field, the present invention relates to games including means for processing electronic data in a game requiring strategy or problem solving by a participant. Concerning the education field, the present invention relates to the education and demonstration field for business or economics. Concerning the finance field, the present invention relates to trading, matching or bidding. Concerning the modeling field, the present invention relates to modeling by mathematical expression.

2. Related Art: Stock Market Games

Over the last years, the development of new information and communication technologies, and namely the Internet, has totally transformed the relationship between financial operators and customers. As financial information and services are now available online, stock market games are commonly used by financial operators to promote their commercial offers of trading services and investment products through remote communication systems.

These games are usually simulation games, namely portfolio management games. Players are taken into reality-based environments where they can make virtual investment decisions and measure their would-be performance. The main purpose of these games is educational, as lack of knowledge concerning market mechanisms and financial techniques is most always alleged when people explain why they are reluctant to become investors. By enabling users to discover and practise trading techniques without risking real money, financial operators expects some of them will eventually invest their money and become their customers.

The fact is that predicting market trends and building corresponding investment strategies is of a matter of knowledge and experience and not a matter of chance. Analysts comments, market reports, technical analysis or charts, namely, may be used for decision making.

In order to make them attractive, and not only educational, financial operators usually organise financial market games as competitions where top-ranked players win prizes. Players are given a virtual amount of capital to trade with. At the end of the competition duration—for instance after two weeks—, amounts of virtual capital are compared and the best performers—for instance the three first ones—win pre-announced prizes.

Organising a competition is an easy way for the game organiser to limit its own risks relative to prizes distribution. Amounts dedicated to prizes are fixed in advance, allocated to a pre-defined number of winners and/or divided among winners if needed. As prizes do not depend on market variations, the risk of the game organiser is fixed and limited.

But such financial games have limitations and drawbacks, and namely the following ones:
 they require a real commitment. Players have to play every day and over a relatively long period, for instance two, weeks before they know if they win. This namely is a major drawback in the Internet world where users expect everything to be fast.
 they are more educational than fun. Therefore, they are definitely suitable for someone who is already motivated: for instance, someone who is almost decided to become an investor but still hesitates or someone who is decided to take a financial training. But they are not suitable to attract the attention of someone who had no previous motivation and their concept may even be deterrent for absolute beginners.
 they are organised like competitions. Therefore, players win prizes not by direct reference to the market but by reference to other players. Namely, a player can perform well but never be rewarded because of better-ranked competitors. A bad performer can even be rewarded with a bad market performance as soon as others are worse players than him. This is due to the fact that gains are never triggered by market conditions exclusively, which is of course the case in the real market. This is a real paradox as those games claim to be close to the market reality for playing but have nothing in common with market rules anymore when it comes to gains.
 moreover, the number of winners is defined in advance in the competition rule. Mathematically, the more players there are in the competition, the less chances there are for a individual player to win a prize. For an individual player, a competition almost stops to be attractive in terms of gains as soon as it becomes successful in terms of audience.
 in addition, individual gains a winner can get from the game are not variable according to market evolutions. In real markets, value variations and volatility directly drive players strategies.

By contrast, financial trading is not a matter of competition but a matter of individual anticipation. What is needed is a game which can enable players, not only to play but also to gain according to real market rules: individual gains which do not depend on the number of other players or winners but only on real markets evolutions. In other words, what is needed is a free game offer built as a real financial product offer wherein financial products would be distributed for free on a regular basis and give the right to a prize in the case of good market anticipation.

This is close to the definition of a financial option, but presently existing options have a far too limited leverage to be used as such financial products. Their cost is too high to be taken on by a game organiser in order to distribute them for free to the players. What is needed is a very high leverage new type of option which can both have a limited cost and, under specified conditions, give the right to high value prizes in the very short term.

What is further needed is a method of risk measurement and mathematical modeling which can enable the game organiser to estimate and pilot its costs relative to prizes.

What is also needed is a commercial method which can make the general public aware of the specificity of such a game offer: not another presently existing stock market competition but a game where you can make individual gains from the market for free.

3. Related Art: Finance and Trading

Financial markets enable investors to invest in assets which can be more or less risky assets according to the risk exposure they choose and the anticipation on the future variation of the assets they make.

An investor who is ready to take more risks for higher expected pay offs can conduct different strategies in order to leverage its investment:

he can buy a listed asset with a high volatility. He will have to bring the total amount of money to be able to buy it, but the potential leverage comes from the fact that, because of the volatility, there are more chances he gets a higher variation in quotations, i.e. a higher gain or a higher loss, he can buy a futures or forward contract. The high potential leverage comes from the fact he will have to bring immediately only a fraction of the total value of the underlying asset to buy it (for instance 20%) whereas he can expect a future gain or loss relative to the total value of the underlying asset, he can buy an option contract or warrant. The higher potential leverage comes from the fact he doesn't purchase the underlying asset, but only the right to buy it or sell it according to predefined contract terms. The purchase price is therefore far lower, as the right can only be exercised under specified conditions, namely conditions concerning the value of the underlying asset until the expiration date of the contract.

Let us give an illustrative example of a good anticipation decision. In the first case hereabove, investing 100 dollars in an underlying which goes upward to 150 dollars would make a return of 150 minus 100 divided by 100 i.e. a leverage coefficient of 0.5. In the second case, investing 20% of 100 dollars for a similar underlying asset which goes upward to 150 dollars would make a return of 150 minus 100 divided by 20, i.e. a leverage coefficient of 2.5. In the third case, good deals on the options markets can often show returns with leverage coefficients comprised between 2 and 20.

Let us keep the same example but with a wrong anticipation decision. In the first case, investing 100 dollars in an underlying which goes downward to 50 dollars would make a return of 50 minus 100 divided by 100 i.e. a leverage coefficient of minus 0.5. In the second case, investing 20% of 100 dollars for a similar underlying asset which goes downward to 50 dollars would make a return of 50 minus 100 divided by 20, i.e. a leverage coefficient of minus 2.5. In the third case, bad deals on the options markets at worst make you lose your money, i.e. a leverage coefficient of minus 1.

These existing solutions have limitations and drawbacks for the regular investor, and namely the following ones:

playing the volatility of assets gives a very limited leverage only, playing futures or forward contracts expose the investor to a loss potentially greater than the capital needed to initiate the financial operation, the options and warrants offers remain complex to deal with for the regular investor, there is no offer of very high leveraged products to the regular investor, i.e. with a leverage coefficient (in the sense of the calculations hereabove) of 200, 1000 and more.

Proposing very high leveraged products on the financial markets would have many advantages:

very high leveraged products can be traded at a very low price unit, and therefore make it possible for people to become an investor with less money and give open access to the financial markets to a broader range of people, very high leveraged products can show very high returns if the anticipation is good, and therefore make it possible for financial operators to attract new customers with this type of product, for instance gamblers who are presently only considering making money with games of luck and without strategy, attracting the huge amount of money spent in games of luck towards the financial markets would add risk-taking capacities to the market and, eventually, enable more listed companies to invest in many more risky projects, and namely in the innovation field.

What is needed is a financial method to provide the regular investor with a financial product which have a far higher leverage than presently existing ones, that product being built as an option or warrant in order to limit the potential negative leverage.

4. Related Art: Finance and Trading: Risk Coverage

Options are specific derivative securities which were originally created to enable investors who are concerned with an primary asset (such as stocks, bonds, raw material) to cover their risks of financial loss. However, in theory as well as in practise, covering risks related to an asset considerably reduces total potential gains because of high costs of risk coverage. In the best case, gains are then those you can expect from a non-risky asset such as a monetary asset. Therefore, a new type of derivative product which could notably reduce risk coverage costs would be very useful.

Moreover, financial markets are now global. Many American companies are now financed by foreign investment funds which invest in stocks. Foreign investment funds also purchase US Treasury Notes and massively finance the American public debt. But these foreign investors are then facing a double risk: first, the risk to see a decline in the value of the particular asset they purchase and, secondly, the risk to see a decline in the value of the dollar expressed in their own foreign currency. For those specific investors, a new type of derivative product which could reduce risk coverage costs would be a major issue.

BRIEF SUMMARY OF THE INVENTION

The invention is relative to a financial forecasting game making use of combined financial assets. It comprises the general description of the game method, methods and processes set up to operate the game, a specific embodiment functioning with three stock market indexes, and other particular embodiments of the game.

The general description of the process explains the principles of a financial forecasting game. The players have to forecast the level of quotations in the future, on a given date, of several quoted securities. The players express their forecasts in a combined bet form, i.e. their forecasts for those different securities are considered as one single bet. On maturity date, and for each concerned security, the effective quotation level is compared with the forecast. This enables the game organiser to identify the forecasts which turned out to be correct. A single bet, being composed of several expressed forecasts, can therefore contain a variable number of correct forecasts.

The number of correct forecasts appearing within a single bet is used as criteria to determine the list of winning bets. A diversity of winning combinations is possible, the best being a combined bet where every forecast turned out to be correct. Those winning combinations can also be considered on a group of bets, and namely a group composed of a similar bet placed on several consecutive periods.

The gains attributed to the winning bets can be fixed amounts. They can also be variable amounts, calculated in that case using one or several predefined mathematical formulas including elements which vary along with the financial markets.

In addition to its innovative content, the usefulness of the invention and its working processes concern several fields:

it enables the game organiser to produce a financial market game which can be probability modeled, it enables the game organiser to pay the winners with individual amounts (and not only one amount shared between the winners or attributed to the first winner only), it enables the game organiser to pay the winners with variable amounts which depend on the evolution of the stock markets (and not only fixed amounts).

The basic characteristics of the game invented, the fact that gains are individual, unlimited in number, unshared by winners, closely related to the evolution of the financial markets, normally paid in cash, enable the organiser using Internet to offer to players The basic characteristics of the game invented, the fact that gains are individual, unlimited in number, unshared by winners, closely related to the evolution of the financial markets, normally paid in cash, enable the organiser using Internet to offer to players services very similar to those proposed by a financial fixtures or options trading platform dealing with stock-markets. That represents an original way to educate people to financial culture using the new business process of a free place where you can make stock gains without capital.

Particularly, in one of the services offered called game b, the gains of a player even vary in function of the moves of the stock-markets and their volatility. As a matter of fact, this method can be used as well for a game service or for delivering a specific financial security very close to a financial option. This specific financial security called here dot-option can offer to investors a level effect in a range of 200 to 1000 whereas existing options have a level effect comprised between 2 and 20. These high leverage products can be traded at a very low price unit and therefore can give open access to the financial markets to a broader range of people deserting games of luck for the financing of industry and innovation.

Another method developed in the game to multiply the level effect is the combined betting on different assets. The use of this process in the financial field can give birth to multi-assets options. This kind of derivative product could notably secure the investors in financial markets by reducing risk coverage costs. They are particularly adapted to foreign investors on stocks or Notes suffering of both a risk of investment and a risk of change.

BRIEF DESCRIPTION OF THE SEVERAL VIEWS OF THE DRAWING

Not applicable

DETAILED DESCRIPTION OF THE INVENTION

The invention comprises:

1—A method for a stock market game using combined financial assets,

2—Methods and processes enabling the implementation of such a game, namely:
    2.A—Methods and processes enabling the game organiser to increase or to decrease the number of winning bets,
    2.B—Methods and processes enabling the game organiser to calculate the occurrence probability of winning situations,
    2.C—Methods and processes enabling the game organiser to calculate the mathematical expectation of payments to the winners,
    2.D—Methods and processes enabling the game organiser to pay the winners with variable amounts depending on the evolution of the stock markets,
    2.E—Methods and processes enabling the game organiser to pattern the size of variable amounts paid to the winners according to a predefined average amount level,
    2.F—Methods and processes enabling the game organiser to measure game performances for each player, 3—A detailed particular embodiment of the game with its methods and processes
    3.A—Description of the embodiment and its specific game rules and principles
    3.B—Methods and processes enabling the game organiser to determine the probability law
    3.C—Methods and processes enabling the game organiser to validate and optimise the model
    3.D—Methods and processes enabling the game organiser to calculate the combinations
    3.E—Methods and processes enabling the game organiser to calculate the risks
    3.F—Methods and processes enabling the game organiser to calculate the steering variables 4—Other particular embodiments of the game, using similar methods and processes as in parts 2 and 3 hereabove.

5—Methods and processes enabling a financial operator to use the preceeding methods and processes exposed in order to distribute financial products.

6—Methods and processes enabling a financial operator to provide a multi-assets option.

1—A Method for a Financial Forecasting Game Making Use of Combined Financial Assets Further description of the game method (developing the brief description of the invention hereabove):

Game General Principle

The game general principle consists in considering several quoted securities during a given period, to gather the players forecasts on the level of quotation at the end of the period, to determine the list of the winning combined bets and the corresponding gains by using calculation methods.

Compliance with Applicable Laws

The game implementations have to comply with applicable laws and regulations in the States where the game is run. Namely, they will have to comply with laws and regulations ruling minors protection, online gambling, free online gaming, chargeable online gaming, and all legal constraints set up by the financial markets relevant authorities (namely the SEC—Securities and Exchange Commission— and the CFTC—Commodity Futures Trading Commission—).

Technical Environment of the Game

The exchange of information between the game organiser and the players is carried through means of remote communications (Internet, mobile phone, fixed telephone, interactive television, interactive kiosks, etc). The game organiser uses material equipments and softwares enabling him to deliver its services to the players through a communication network. The players can access the game through their terminals by remote connection to a communication network.

Players Identification

On their first connection, players have to fill in a registration form which namely enables the game organiser to establish their precise identification and their legal, right to participate in the game (namely for conditions concerning age and State residence). Then, on each game participation, players must give out their identity so that their forecasts can trustfully be attributed to them. A password system can be used therefore, or any other system enabling the game organiser to obtain that result.

Game Organisation

The game organiser chooses the periods of time and the financial securities on which he authorizes the players to make forecasts. The forecasts are expressed in a numerical format predefined by the game organiser. The game organiser announces the rules of the game. Namely, he announces the conditions and the precision degree under which forecasts will be considered to be correct at the end of the game period, combinations which will be considered as winning at the end of the game period, the nature of the corresponding gains, the rules of calculating the corresponding gains, the rules of attributing the gains to the winners.

Game Action

For the player, the game action consists in giving out its forecasts in the format and under the conditions required by the game organiser. The forecasts concern, for a given period of time, several quoted financial securities. Once he has given out its forecasts, the player has to validate his choices by actuating a button specified by the game organiser.

Notice of Winning Bets

At the end of the given period of time, the gathered forecasts on the quoted securities are compared to the effective quotation levels of those securities. The game organiser can then notice the reality of winning situations according to the previously announced rules, namely those defining the precision degree required for the forecasts and those defining the winning combinations. On that basis, the game organiser can proceed the gains calculations and then attribute the gains according to the previously announced game rules.

Application Fields

The considered period of time can be any type of duration and namely a day, a week, a fortnight, a month, an hour, a minute.

The considered quoted financial securities can be any type of security or fund, quoted either on a spot or forward market, and namely quotes for market indexes, stocks, currency exchange rates, precious substance, gold, raw material, oil, energy securities, bonds, trackers, mutual funds.

The considered winning combinations can be any type of combination made of expressed forecasts on securities and considered as correct. Namely, it is possible to consider a bet in which every single expressed forecast is correct, it is possible to consider a bet in which some of the expressed forecasts are correct, it is possible to consider several bets—and not a single one—as a group and apply combination analysis to the so-built set.

In that case, a set of bets can be any type of set. For instance, and those are not limitative examples, it can namely be a set of bets which are consecutive through time, a set of bets of similar type, a set of bets of different types, a set of bets expressed by different players.

2.A—Methods and Processes Enabling the Game Organiser to Increase or to Decrease the Number of Winning Bets 2.A.1—Concerning Correct Forecasts A general method consists in introducing variations in the precision level required so that the game organiser takes the expressed forecast as a correct forecast. To tolerate a lower precision level leads to consider a higher number of expressed forecasts as correct. On the contrary, to require a higher precision level leads to consider a lower number of expressed forecasts as correct.

A process to get a maximum precision level is to require an exact equality between the forecast expressed by the player and the effective value of the quote at the end of the considered period of time. When the securities are quoted with values including a whole number portion and a decimal portion, the exact total value has to be taken into account to consider an expressed forecast as a correct forecast.

A process to introduce tolerance margins in the game is to consider only the whole number portion of the quote. For example, a forecast for a quote where <<n>> is the whole number portion and <<d>> the decimal portion can then be considered as a correct forecast whatever the value of <<d>> as long as <<n>> is exact.

Another process to introduce tolerance margins in the game is to consider a deviation is acceptable, that deviation being expressed in points. For example, a forecast for a quote where <<n>> is the whole number portion and <<d>> the decimal portion can then be considered as a correct forecast whatever the value of <<d>> as long as <<n>> is exact, or <<n−1>> is exact, or <<n+1>> is exact. We then say the tolerance margin is fixed by the game organiser to one point above or under the whole number portion of the quote.

The process explained hereabove can be applied with tolerance margins which the game organiser can fix to 1, 2, 3 . . . n points above or under the whole number portion of the quote.

Another process to introduce tolerance margins in the game is to apply the process explained hereabove, but the tolerance being expressed in fractions of points. This process can be applied to quotes with a lower nominal value (such as certain stocks) or to quotes including a long decimal portion (such as currency exchange rates).

2.A.2—Concerning Winning Combinations

A general method consists in using variations of the combinations number C(n,p) where <<n>> is the total number of forecasts included in a combined bet and where <<p>> is the minimum number of correct forecasts required for the bet to be considered as a winning bet by the game organiser.

One process consists in using variations of the number <<n>> of forecasts composing a same bet.

Another process consists in using variations of the minimum number <<p>> of correct forecasts required for the bet to be considered as a winning bet.

Another process consists in using the two processes described above together.

Another process consists in setting groups of bets, which can lead to variations of <<n>> and <<p>>, and apply combinatory analysis to the so-built sets.

2.B—Methods and Processes Enabling the Game Organiser to Calculate the Occurrence Probability of Winning Situations The general method consists in determining successively the probability law of a quoted security, the probability that winners exist on that security, to proceed that way for each security included in the bet, to apply a combinatory calculation to the probabilities of existence of winning forecasts in order to determine the probability of existence of a winning bet.

The methods and processes used are as follows:

2.B.1—Determination of the Probability Law of the Quoted Security

For a given security, a process consists in considering that the variation in the quotes between two consecutive periods of time, expressed as a percentage, forms through time a series whose distribution can be approximated by a Gauss law. The study of historical quotes enables the game organiser to determine a value for the average <<m>> and the standard deviation <<σ>>. This process enables the game organiser to determine for the quoted security a distribution law of its possible values, and consequently, to quantify an occurrence probability for each of those values.

A process which is a variant of the previous process consists in considering sliding horizons. The study of historical quotes is realised on the same series as above. But the calculations are made with sliding averages and sliding standard deviations calculated on the last <<n>> periods of time. The number <<n>>, which determines the sliding horizon, can be optimised using a statistical study of historical quotes in order to obtain the best approximation of the quoted security distribution.

2.B.2—Determination of the Existence Probability of Winning Forecasts

The general method consists in taking into account both the distribution law of the players forecasts and the distribution law of the quoted security. A process consists in considering that the distribution law of the players forecast is equivalent to the distribution law of the quoted security. The probability of existence of winning forecasts can then be estimated using the of the distribution law squared.

2.B.3—Probability of Existence of a Winning Bet

The general method consists in applying combinatory calculations to the events <<existence of winning forecasts>>, the elementary probability of each event being calculated with the processes hereabove defined.

2.B.4—Probability of Existence of a Winning Bets Group

The general method consists in applying combinatory calculations appropriate to the particular situations of one or several groups of winning bets.

2.C—Methods and Processes Enabling the Game Organiser to Calculate the Mathematical Expectation of Payments to the Winners The methods and processes used are as follows:

2.C.1—Process to Determine the Mathematical Expectation of a Fixed Payment $E(F) = p \times F$ where E is the mathematical expectation of a fixed payment, F the fixed amount, and p the probability of existence of a winning bet 2.C.2—Process to Determine the Mathematical Expectation of a Payment which Varies According to the Difference in Security Quotes Through Time (for One Forecast).

A process consists in using the probability law of existence of winning forecasts (called G) as defined in paragraph 2B2 of the previous part and consider that the variable amount paid to each winner is the variation in quotes through time, calculated as the difference between two quotes, expressed in points and in absolute value (called |t|).

Using that process, $$E(|t|) = \int_{-\infty}^{+\infty} |t| G(t) \, dt$$

The mathematical expectation can then be calculated using mathematical methods (changes of variables, vectorial sums, equation fractioning) or by computer with mathematical software.

2.C.3—Process to Determine the Combined Mathematical Expectation of a Payment which Varies According to the Difference in Security Quotes Through Time (for One Bet Composed of Several Forecasts).

A process consists in considering that the forecasts composing a same bet correspond to independent random variables A, B . . . Z.

It is therefore possible to develop the formula $E(|A| + \ldots + |Z|)$ expressing it as a function of elementary mathematical expectations $E(|A|), E(|B|), \ldots, E(|Z|)$, of elementary probabilities $p(A), p(B), \ldots, p(Z)$, and taking into account the combinations considered as winning combinations (number of winning forecasts required to qualify a winning bet).

The terms $E(|A|), \ldots E(|Z|)$ are the mathematical expectations for the securities A, . . . Z and are calculated using the process defined hereabove in paragraph 2C2. The terms $p(A), p(B), \ldots p(Z)$ are the forecast probabilities for the securities A, . . . Z and are calculated using the method and processes defined hereabove in paragraph 2B2 of the previous part.

A particular application of that process to a combined bet composed of three forescasts where the three forecasts have to be winning forecasts to qualify a winning bet gives the following formula:

$$E(|A|+|B|+|C|) = E(|A|) \times p(|B|) \times p(C) + E(|B|) \times p(A) \times p(C) + E(|C|) \times p(A) \times p(B)$$

2.D—Methods and Processes Enabling the Game Organiser to Pay the Winners with Variable Amounts Depending on the Evolution of the Stock Markets The general method consists in announcing, instead of a fixed gain whose amount is determined in advance, a variable gain whose amount is not determined in advance but calculated by using a formula determined in advance. This formula is a mathematical function which, for every forecast, depends on variable data taken from the financial markets and on fixed parameters fixed in advance by the game organiser.

A process consists in announcing a formula which considers the following elements (for every forecast):

1—the variable taken from the financial markets is the difference in quotation levels noted through time. For a quote value at the end of the previous period being (Ct), and a quote value at the end of the current period of time being (Ct+1), the considered variable called Delta is the absolute value |(Ct+1)−(Ct)|.

2—the parameter Vp is determined in advance by the game organiser and is called <<point value>>.

3—the formula enabling the game organiser to pay the winning forecast is Gain=Delta×Vp.

For each winning bet, the calculation method consists then in considering every correct forecast within the winning bet, then applying the process hereabove to determine the gain corresponding to each of those correct forecasts within the winning bet, and eventually make a sum of all those gains.

A process to simplify the previous process consists in considering only one point value Vp, which is determined for all the forecasts, whatever the security. The gain corresponding to the winning bet is then calculated by taking the sum of the quotes variations (sum of the Deltas) multiplied by a unique parameter Vp.

For the calculation of quote variations, an exact way of proceeding is to consider the total value of the quote including the whole number portion and the decimal portion. It is also possible to proceed with rounded numbers, by calculating the quote variation from rounded quotes. A way of rounding can consist in considering only the whole number portion of the quote. Another way of rounding consists in cutting the end of the decimal portion.

2.E—Methods and Processes Enabling the Game Organiser to Pattern the Size of Variable Amounts Paid to the Winners According to a Predefined Average Amount Level The general method consists in taking into account, for every game period of time, the volatility of the quoted security in order to determine the corresponding value point. Patterning the size of the variable amounts paid according to an average amount aims at having the point value vary in an inverse proportion of the number of points the game organiser expects to have to pay for.

The general method consists in proceeding, for each security, according to the following steps:

1—First, calculation of the previsional spread $S_{t+1}$ of the quoted security for the t+1 period. A Gauss law is used in order to estimate the distribution of the quoted security. It is called p (t; m; σ.), t being the sliding horizon, m the average and σ the standard deviation. The spread can be estimated to 4σ multiplied by the projected quoted value of the security for the n+1 period of time.

2—Secondly, expression of the point value in proportion of the previsional spread by a formula $VP_{t+1} = K \cdot S_{t+1}$ with K being a constant to be parametered.

3—Thirdly, calculation of the parametered constant K using L, $E_t$ et $P_t$ with L being the average gain amount on the base period of time, $E_t$ being the mathematical expectation of the number of points to pay for on period t, and $P_t$ being the probability of winners existence on period t.

In order to do so, one considers that L equals the sum, for all values t, of $E_t$ multiplied by $VP_t$ and divided by the sum, for all values t, of $P_t$. Once $VP_t$ is substituted by K multiplied by $S_t$, one can then calculate the value of K for the period t from the values of L, $E_t$, $P_t$, and $S_t$.

2.F—Methods and Processes Enabling the Game Organiser to Measure Game Performances of Each Player The general method consists in measuring the quality of the forecasts expressed by the players by measuring the difference between the forecasts and the effective level of quotes.

A process consists in calculating the difference between the forecast and the effective level of the quote for a security, expressed in points and in absolute value. The closer this number stands to zero, the better the forecast is.

Another process consists in applying the hereabove process, but without considering the decimal portion of the numbers.

Another process consists in applying the hereabove process, but with rounded values.

For a bet combining several forecasts, the process consists in cumulating, for all the forecasts included in the bet and in absolute value, the difference between the forecasts and the effective quote levels using any of the hereabove described processes.

The process of <<scoring>> aims at giving a quality measure to each bet (<<the score>>), as defined hereabove, and to provide the player with his historical series of scores for him to be able to appreciate his own daily performance and the evolution of his performance through time. It can also enable the game organiser to make comparisons between players and between bets.

The process of <<rating>> consists in giving a level to a player as soon as he has bet regularly on the last x market days. It consists in determining several rating categories corresponding to a minimum scoring level obtained during a base period of time. For example, rating categories can be <<beginner>>, <<expert>>, etc. The daily scores of the player are cumulated through the base period of time, and this cumulated score gives the player the opportunity to be admitted to the corresponding rating category.

The process of <<ranking>> consists in giving a rank to a player as soon as he has bet regularly on the last y market days. The population of all the players who have regularly bet on the last y market days is considered. For each player, the daily scores are cumulated through the base period of time. The players are then ranked from the first to the last one according to their cumulated score. The ranking of each player is expressed as a percentage of the considered population of players, i.e. top 1%, top 2%, . . . top n % of the considered population of players.

3—A Detailed Particular Embodiment of the Game with its Methods and Processes

The following part explains the mathematical and statistical elements used to operate a financial forecasting game making use of combined financial assets and functioning with three stock market indexes.

3.A.1—Game Principles

The general principle of the game is to express daily forecasts on the level of three main stock market indexes, as quoted at the close of the following market session.

Within one single daily bet, each player has three ways of winning:

Game A—Three Indexes, Including the Decimal Portion, on One Day

The player has to forecast three exact indexes, including the decimal portion of the indexes. Each winner is paid a fixed amount which is announced in advance, Game B—Three Indexes, without the Decimal Portion, on One Day It is like game A, but the indexes are considered only for their whole number portion. Each winner is paid a variable amount which corresponds to the real indexes point variations. To calculate the level of the amount, the interday point variations are added for the three indexes, without considering the decimal portions, in absolute value, and then multiplied by a daily point value which was announced on the previous day by the game organiser, Game C—Three Different Indexes, without the Decimal Portion, Over Three Days It is like game B, but extended over three sliding consecutive days. A winning trio is composed of an index of each kind. Any index found in a bet is considered to be found for the bets of the following two days as well. A day without playing, or any gain occurring in games A, B or C provoke a <<reset>> and erase the already found indexes. Each winner is paid a fixed amount which is announced in advance.

Games B and C can be run with a tolerance margin expressed in index points, and announced in advance. For example, when the game organiser announces a tolerance margin of x points, he accepts as a correct forecast the exact index for its whole number portion i, but he also considers as correct the forecasts i+1, i+2, . . . i+x and the forecasts i−1, i−2, . . . i−x.

3.A.2—Issues of the Mathematical and Statistical Approach

A formal mathematical and statistical approach is useful:

for marketing credibility. The game concept must be able to show a sufficient and mastered number of winners. A probability study must enable the game organiser to estimate the number of winners by game type, for financial feasability. The game proposes to pay winners with individual gains and it is a major issue to estimate the financial risks taken by the game organiser. Moreover, financial budgeting needs to estimate the amounts and to control the costs per bet. A statistical calculation of mathematical expectations of payments to the winners has to estimate the expected financial risks and budgets by game type, for operations steering. Game B announces a point value each day for the following stock market session. The quotation system must enable the game organiser to best anticipate the market situations by taking the volatility into account. The mathematical formula giving the point value price has to be explicited.

More generally, the capacity to achieve those works depends on the prior determination of a specific probability model. As a comparison, a lotto drawing considers a predetermined number of equivalent possibilities. The stock market indexes can not be considered in the same way as one can understand that their variations possibilities are theoretically infinite and non equivalent. The explicitation of a specific probabilistic approach, effective and modelled, is a prerequisite.

3.A.3—Following Contents Presentation

The following contents match the hereabove issues:

the part <<Methods and processes enabling the game organiser to determine the probability law>> presents the probabilistic model used and the basic calculation formulas it enables the game organiser to use, the part <<Methods and processes enabling the game organiser to validate and optimise the model>> analyses the CAC, the Dow Jones and the Nasdaq indexes exhaustively through a 13 year period of time. It measures the indexes correlation, estimates the forecasting capacity of the probability model, and then optimises it using a sliding horizons method, the part <<Methods and processes enabling the game organiser to calculate the combinations>> presents the formulas enabling the game organiser to estimate the expected winners number by game type, the part <<Methods and processes enabling the game organiser to calculate the risks>> presents the formulas enabling the game organiser to estimate financial risks and budgets by game type, the part <<Methods and processes enabling the game organiser to calculate the steering variables>> presents the formula of daily point value quotation along with the calculation formula enabling the game organiser to use tolerance margins in games B and C.

3.B—Methods and Processes Enabling the Game Organiser to Determine the Probability Law This part aims at expliciting the processes of reasoning and calculating which enable the game organiser to quantify occurrence probabilities and forecast probabilities of a stock index level.

3.B.1—Preliminary Note

Bachelier was the first to explain to Poincaré the theory according to which stock prices evolution follow a Gauss Law.

Mandelbrot, Fields Medal, precised that this evolution follow Gauss Laws with dimensions which vary through time.

3.B.2—Probability of Values Occurrence (Expression of Formula 1-2)

Let us consider a given stock index and let t be its interday variation:

$$t = \frac{C_t}{C_{t-1}} - 1$$

with $C_t$ representing the quote value at the close of the market on day t and $C_{t-1}$ representing the quote value at the close of the market on day t−1

In accordance with Bachelier and Mandelbrot works, one can notice that the series through time of the random variable t forms a normal distribution with an average <<m>> and a standard deviation <<σ>>.

Conventionally, let this normal law be called p(t) with:

$$p(t) = p(t, m, \sigma) = \frac{1}{\sigma\sqrt{2\pi}} e^{\frac{-(t-m)^2}{2\sigma^2}}$$

So calculated, p(t) is the probability distribution law for a given index to occur to such or such level. It is the probability of the index <<taking>> a specific value.

3.B.3—Probability of Winners Existence (Expression of Formula 1-3)

Let us consider P being the total probability for the game organiser to pay a winner:

$$p = \sum_{indexes} p(t) \cdot p(j)$$

with p (t) being the probability an index level occurs
and p (j) being the probability for one player to position his bet precisely on this index level.

As game strategies have an impact on the game organiser, we are led to make an assumption on the distribution of the bets. Intuitively for the player, all positions are possible but they do not have the same probability to occur. We can most likely anticipate various situations and players tending to have a trend following behaviour. Our work hypothesis is a bet distribution similar to the index distribution.

$$P = \sum_{indexes} p(t) \cdot p(j)$$

$$= \sum_{indexes} p^2(t)$$

$$p(t) = \frac{1}{\sigma\sqrt{2\pi}} e^{\frac{-(t-m)^2}{2\sigma^2}} \text{ then}$$

$$p^2(t) = \left[\frac{1}{\sigma\sqrt{2\pi}} e^{\frac{-(t-m)^2}{2\sigma^2}}\right]^2$$

$$= \left[\frac{1}{\sigma\sqrt{2\pi}}\right]^2 e^{\frac{-(t-m)^2}{2\sigma^2}}$$

$$= \frac{1}{2\sigma\sqrt{2\pi}} \left[\frac{1}{\frac{\sigma}{\sqrt{2}}\sqrt{2\pi}} e^{-\frac{(t-m)^2}{2\left(\frac{\sigma}{\sqrt{2}}\right)^2}}\right]$$

$$p^2(t) = \frac{1}{2\sigma\sqrt{2\pi}} \varphi\left(t, m, \frac{\sigma}{\sqrt{2}}\right)$$

$$\Phi(t) = \int_{-\infty}^{t} p^2(t) dt$$

$$= \int_{-\infty}^{t} \frac{1}{2\sigma\sqrt{\pi}} \varphi\left(t, m, \frac{\sigma}{\sqrt{2}}\right) dt$$

$$\Phi(t) = \frac{1}{2\sigma\sqrt{\pi}} \int_{-\infty}^{t} \varphi\left(t, m, \frac{\sigma}{\sqrt{2}}\right) dt$$

-continued $$P = \lim_{t \to +\infty} \Phi(t)$$

$$= \frac{1}{2\sigma\sqrt{\pi}} \int_{-\infty}^{+\infty} \varphi\left(t, m, \frac{\sigma}{\sqrt{2}}\right) dt$$

$$\approx \frac{1}{2\sigma\sqrt{\pi}}$$

3.C—Methods and Processes Enabling the Game Organiser to Validate and Optimise the Model This part aims at expliciting the processes of reasoning and calculating which enable the game organiser to validate the probability law used and to optimise it.

3.C.1—Indexes Correlation

Let us consider the interday variations of three main stock market indexes: CAC 40, Dow Jones Industrial Average and Nasdaq Composite.

$$t = \frac{C_t}{C_{t-1}} - 1$$

with $C_t$ representing the quote value at the close of the market on day t
and $C_{t-1}$ representing the quote value at the close of the market on day t−1

Method used:
1—base period of time is 13 years, from Jan. 26, 1988 to Feb. 7, 2001
2—calculation of daily interday variations for each index
3—corrective substitutions of indexes on public holiday
4—correlation coefficients two by two using the formula:

$$\text{Correlation}(X;Y) = \frac{\text{Cov}(X;Y)}{\sigma_x \sigma_y}$$

The principle considered is a possible daily bet on three indexes as soon as one of the three indexes at least is active. This is the case when public holidays in France and in the United States do not match. In that case, the unexisting index value is substituted with that of the following existing index value.

Results:
base of 3366 sessions
correlations
(CAC; Dow)=69.5%
(CAC; Nasdaq)=72.2%
(Dow; Nasdaq)=74.7%
Conclusion:
Correlation between the three indexes, but not to a sufficient degree to be considered as effective for the searched precision levels.

3.C.2—Level of Forecasting Capacity

Let us consider the CAC 40 index through 12 years, from Jan. 3, 1989 to Feb. 7, 2001. Let t be the random variable of interday variations.
Through that period of time:
n=3026 market sessions
m=0.05
σ=1.22%
Using a retrospective method, we have analysed the forecasting capacity of the distribution law φ (t, m, σ) as follows:
Method used:
1—division of the probabilistic set into nine base sub-segments. The bounds of theses sub-segments are positioned so as to capture the sub-segments of the normal law φ (t, m, σ) by slice of 10% until 90%.
2—retrospectively through the period of time, daily forecast of a target value for the following day. The forecast is obtained by taking the previous day's close value and projecting it by using the average m.
3—comparison of obtained target values with the bounds of base sub-segments. A breakdown allocates each target value to <<its>> sub-segment.
4—totalisation of the situations through the period of time. One can then compare the shape of the two probability distributions and measure the difference between the forecasting method used and a theoretical normal law.

On 3026 trading sessions, each slice of 10% represents a population comprising around 300 cases. This level seems to be a good compromise between the sharpness desired for the sub-segmentation and the minimum size desired for samples.

Results:
base of 3026 sessions CAC 40
totalisation of differences in absolute value: 11%

|  | Slices of sub-segment | | | | | | | | | |
| --- | --- | --- | --- | --- | --- | --- | --- | --- | --- | --- |
|  | 1 | 2 | 3 | 4 | 5 | 6 | 7 | 8 | 9 | Total |
| Normal law | 10% | 10% | 10% | 10% | 10% | 10% | 10% | 10% | 10% | 90% |
| Tested law | 13% | 11% | 11% | 11% | 11% | 9% | 10% | 9% | 7% | 91% |
| Difference | 3% | 1% | 1% | 1% | 1% | 1% | 0% | 1% | 3% | 11% |

Conclusion:
The forecasting capacity is comparable to that of a normal law by around 89%.

3.C.3—Optimisation Through Sliding Horizons

Let us consider a similar method, but applied to sliding horizons. The tested forecasting capacity is no longer that of a distribution with a fixed average and standard deviation but that of families of normal laws with a sliding horizon <<x>>.

Method used:
1—retrospectively through the studied period of time, daily calculation of sliding averages $mx_t$ and of sliding standard deviations $\sigma x_t$ for the last x days known, x being the sliding horizon.
2—division into nine base sub-segments of 10% corresponding to the normal laws φ (t, $mx_t$, $\sigma x_t$), forecast of target values by projecting the sliding average $mx_t$, allocation of each target value to <<its>> sub-segment.
3—totalisation of the situations through the period of time, by sub-segment, and then totalisation of the differences in absolute value. The minimum number indicates the sliding horizon whose forecasting capacity is most comparable to a normal distribution.

Results:
base of 3026 sessions CAC 40
minimum difference obtained for a sliding horizon of 16 days: 3.8%
Conclusion:
For a tested sliding horizon of 16 days, the forecasting capacity is comparable to that of a normal law by more than 96%.

3.D—Methods and Processes Enabling the Game Organiser to Calculate the Combinations This part aims at expliciting the processes of reasoning and calculating which enable the game organiser to quantify forecasting probabilities of complex events from forecasting probabilities of single events.

3.D.1—Probability of the Couple (3 Indexes; 1 Day)/(Expression of Formula 3-1)

Let
$p_1$ represent the occurrence probability of the event $a_1$
$p_2$ represent the occurrence probability of the event $a_2$
$p_3$ represent the occurrence probability of the event $a_3$
where
$a_1$ is the event <<find index 1 on day t>>
$a_2$ is the event <<find index 2 on day t>>
$a_3$ is the event <<find index 3 on day t>>
The three events are supposed to be independent.

$$p(a) = p(a_1 \cap a_2 \cap a_3)$$
$$= p(X \cap a_3)$$
$$= p(X)p(a_3)$$
$$= p(a_1)p(a_2)p(a_3)$$
$$= p_1 p_2 p_3$$

3.D.2—Probability of the Couple (1 Index; 3 Days)/(Expression of Formula 3-2)

Let
$p_1$ represent the occurrence probability of the event $b_1$
$p_2$ represent the occurrence probability of the event $b_2$
$p_3$ represent the occurrence probability of the event $b_3$
where
$b_1$ is the event <<find the index i on day $t_1$>>
$b_2$ is the event <<find the index i on day $t_2$>>
$b_3$ is the event <<find the index i on day $t_3$>>
The three events are supposed to be independent.

$$p(b) = p(b_1 \cup b_2 \cup b_3)$$
$$= p(X \cup b_3)$$
$$= p(X) + p(b_3) - p(X \cap b_3)$$

$$p(X) = p(b_1 \cup b_2)$$
$$= p(b_1) + p(b_2) - p(b_1 \cap b_2)$$
$$= p_1 + p_2 - p_1 p_2$$

$$p(b) = (p_1 + p_2 - p_1 p_2) + p_3 - (p_1 + p_2 - p_1 p_2) p_3$$
$$= p_1 + p_2 + p_3 - p_1 p_2 - p_1 p_3 - p_2 p_3 + p_1 p_2 p_3$$

3.D.3—Probability of the Couple (3 Indexes; 3 Days)/(Expression of Formula 3-3)

Let
$p_{b1}$ represent the occurrence probability of the event $b_1$
$p_{b2}$ represent the occurrence probability of the event $b_2$
$p_{b3}$ represent the occurrence probability of the event $b_3$ where
$b_1$ is the event <<find at least one index 1 on $t_1$, $t_2$ or $t_3$>>
$b_2$ is the event <<find at least one index 2 on $t_1$, $t_2$ or $t_3$>>
$b_3$ is the event <<find at least one index 3 on $t_1$, $t_2$ or $t_3$>>
Then $$p(c) = p_{b1} p_{b2} p_{b3} - p(e)$$

$p_{b1}$, $p_{b2}$ et $p_{b3}$ are calculated using the formula 1-3, expressed in the hereabove paragraph <<Methods and processes enabling the game organiser to determine the probability law/subparagraph probability of winners existence>> (3.B.3).

Moreover,
Let
$p_{e1}$ represent the occurrence probability of the event $e_1$
$p_{e2}$ represent the occurrence probability of the event $e_2$
$p_{e3}$ represent the occurrence probability of the event $e_3$
where
$e_1$ is the event <<find the three indexes on $t_1$>>
$e_2$ is the event <<find the three indexes on $t_2$>>
$e_3$ is the event <<find the three indexes on $t_3$>>

$$p(e) = p(e_1 \cup e_2 \cup e_3)$$
$$= p_{e1} + p_{e2} + p_{e3} - p_{e1}p_{e2} - p_{e1}p_{e3} - p_{e2}p_{e3} + p_{e1}p_{e2}p_{e3}$$

$p_{e1}$, $p_{e2}$ et $p_{e3}$ are calculated using the formula 1-2, expressed in the hereabove paragraph <<Methods and processes enabling, the game organiser to determine the probability law/subparagraph probability of values occurrence>> (3.B.2).

3.E—Methods and Processes Enabling the Game Organiser to Calculate the Risks

This part aims at expliciting the processes of reasoning and calculating which enable the game organiser to quantify the mathematical expectations of payments to winners, whether fixed or variable, and then to combine them.

3.E.1—Mathematical Expectation of Fixed Payment

Let F represent the fixed payment due to each winner
and p the probability for the game organiser to have to pay a winner
then $$E(F) = p \cdot F$$

3.E.2—Elementary Mathematical Expectation of Variable Payment

Let us consider a forecast concerning only one index
Let
|t| be the variable payment due to each winner
|t| being the interday variation in points and in absolute value $$E(|t|) = \int_{-\infty}^{+\infty} |t| p^2(t) \, dt$$
$$= \int_{-\infty}^{+\infty} |t| \left[ \frac{1}{\sigma \sqrt{2\pi}} e^{\frac{-(t-m)^2}{2\sigma^2}} \right]^2 dt$$
$$= \left[ \frac{1}{\sigma \sqrt{2\pi}} \right]^2 \int_{-\infty}^{+\infty} |t| e^{\frac{-(t-m)^2}{2\sigma^2}} \, dt$$
$$= \frac{1}{2\pi \sigma^2} \int_{-\infty}^{+\infty} |t| e^{\frac{-(t-m)^2}{2\sigma^2}} \, dt$$

Development 1/5
Change of variable:

$$\frac{u^2}{2} = \frac{(t-m)^2}{\sigma^2}$$

We have then:

$$\Leftrightarrow u^2\sigma^2 = (t-m)^2 \cdot 2$$
$$\Leftrightarrow u\sigma = (t-m)\sqrt{2}$$
$$\Leftrightarrow \frac{u\sigma}{\sqrt{2}} = (t-m)$$
$$\Leftrightarrow t = \frac{u\sigma}{\sqrt{2}} + m$$
$$\Leftrightarrow t = \frac{\sigma}{\sqrt{2}}\left(u + \frac{m\sqrt{2}}{\sigma}\right)$$

Also:

$$dt = d\left(\frac{u\sigma}{\sqrt{2}} + m\right)$$
$$dt = \frac{\sigma}{\sqrt{2}}du + dm$$
$$dt = \frac{\sigma}{\sqrt{2}}du$$

The equation becomes:

$$E(|t|) = \frac{1}{2\pi\sigma^2}\int_{-\infty}^{+\infty}|t|e^{\frac{-(t-m)^2}{\sigma^2}}dt$$

$$= \frac{1}{2\pi\sigma^2}\int_{-\infty}^{+\infty}|t|e^{\frac{-u^2}{2}}dt$$

$$= \frac{1}{2\pi\sigma^2}\int_{-\infty}^{+\infty}\left|\frac{\sigma}{\sqrt{2}}\left(u + \frac{m\sqrt{2}}{\sigma}\right)\right|e^{\frac{-u^2}{2}}dt$$

$$= \frac{1}{2\pi\sigma^2}\int_{-\infty}^{+\infty}\frac{\sigma}{\sqrt{2}}\left|u + \frac{m\sqrt{2}}{\sigma}\right|e^{\frac{-u^2}{2}}\frac{\sigma}{\sqrt{2}}du$$

$$= \frac{1}{2\pi\sigma^2}\frac{\sigma^2}{2}\int_{-\infty}^{+\infty}\left|u + \frac{m\sqrt{2}}{\sigma}\right|e^{\frac{-u^2}{2}}du$$

$$= \frac{1}{4\pi}\int_{-\infty}^{+\infty}\left|u + \frac{m\sqrt{2}}{\sigma}\right|e^{\frac{-u^2}{2}}du$$

Development 2/5
Equation fractioning into two terms depending on the sign of the absolute value:

$$\left|u + \frac{m\sqrt{2}}{\sigma}\right| = u + \frac{m\sqrt{2}}{\sigma} \quad \text{if } u + \frac{m\sqrt{2}}{\sigma} > 0 \Longleftrightarrow u > -\frac{m\sqrt{2}}{\sigma}$$

$$\left|u + \frac{m\sqrt{2}}{\sigma}\right| = -u - \frac{m\sqrt{2}}{\sigma} \quad \text{if } u + \frac{m\sqrt{2}}{\sigma} < 0 \Longleftrightarrow u < -\frac{m\sqrt{2}}{\sigma}$$

The equation becomes:

$$E(|t|) = \frac{1}{4\pi}\int_{-\infty}^{+\infty}\left|u + \frac{m\sqrt{2}}{\sigma}\right|e^{\frac{-u^2}{2}}du$$

$$E(|t|) = \frac{1}{4\pi}\left[\int_{-\infty}^{-\frac{m\sqrt{2}}{\sigma}}-\left(u + \frac{m\sqrt{2}}{\sigma}\right)e^{\frac{-u^2}{2}}du + \int_{-\frac{m\sqrt{2}}{\sigma}}^{-\infty}\left(u + \frac{m\sqrt{2}}{\sigma}\right)e^{\frac{-u^2}{2}}du\right]$$

Fractionning of both terms of the equation to zero through vectorial sum: The equation becomes:

$$E(|t|) = \frac{1}{4\pi}\left[\int_{-\infty}^{0}-\left(u + \frac{m\sqrt{2}}{\sigma}\right)e^{\frac{-u^2}{2}}du + \right. \quad \text{term } A$$

$$\int_{0}^{-\frac{m\sqrt{2}}{\sigma}}-\left(u + \frac{m\sqrt{2}}{\sigma}\right)e^{\frac{-u^2}{2}}du + \quad \text{term } B$$

$$\int_{-\frac{m\sqrt{2}}{\sigma}}^{0}\left(u + \frac{m\sqrt{2}}{\sigma}\right)e^{\frac{-u^2}{2}}du + \quad \text{term } C$$

$$\left. \int_{0}^{+\infty}\left(u + \frac{m\sqrt{2}}{\sigma}\right)e^{\frac{-u^2}{2}}du\right] \quad \text{term } D$$

Development 3/5
Through vectorial sum, we have B+C=2B $$E(|t|) = \frac{1}{4\pi}\left[\int_{-\infty}^{0}-\left(u + \frac{m\sqrt{2}}{\sigma}\right)e^{\frac{-u^2}{2}}du + \right. \quad \text{term } A$$

$$2\int_{0}^{-\frac{m\sqrt{2}}{\sigma}}-\left(u + \frac{m\sqrt{2}}{\sigma}\right)e^{\frac{-u^2}{2}}du + \quad \text{term } B+C$$

$$\left. \int_{0}^{+\infty}\left(u + \frac{m\sqrt{2}}{\sigma}\right)e^{\frac{-u^2}{2}}du\right] \quad \text{term } D$$

$$E(|t|) = \frac{1}{4\pi}\left[-\int_{-\infty}^{0}ue^{\frac{-u^2}{2}}du - \frac{m\sqrt{2}}{\sigma}\int_{-\infty}^{0}e^{\frac{-u^2}{2}}du - \right.$$

$$2\int_{0}^{-\frac{m\sqrt{2}}{\sigma}}ue^{\frac{-u^2}{2}}du - \frac{m\sqrt{2}}{\sigma}\int_{0}^{-\frac{m\sqrt{2}}{\sigma}}e^{\frac{-u^2}{2}}du +$$

$$\left. \int_{0}^{+\infty}ue^{\frac{-u^2}{2}}du + \frac{m\sqrt{2}}{\sigma}\int_{0}^{+\infty}e^{\frac{-u^2}{2}}du\right]$$

$$E(|t|) = \frac{1}{4\pi}\left[\int_{0}^{+\infty}ue^{\frac{-u^2}{2}}du - \int_{-\infty}^{0}ue^{\frac{-u^2}{2}}du - \right.$$

$$\frac{m\sqrt{2}}{\sigma}\int_{-\infty}^{0}e^{\frac{-u^2}{2}}du + \frac{m\sqrt{2}}{\sigma}\int_{0}^{+\infty}ue^{\frac{-u^2}{2}}du -$$

$$\left. 2\int_{0}^{-\frac{m\sqrt{2}}{\sigma}}ue^{\frac{-u^2}{2}}du - \frac{m\sqrt{2}}{\sigma}\int_{0}^{-\frac{m\sqrt{2}}{\sigma}}e^{\frac{-u^2}{2}}du\right]$$

$$E(|t|) = \frac{1}{4\pi}\left[\int_0^{+\infty} ue^{\frac{-u^2}{2}}du + \int_0^{+\infty} ue^{\frac{-u^2}{2}}du - 2\int_0^{-\frac{m\sqrt{2}}{\sigma}} ue^{\frac{-u^2}{2}}du - \frac{2m\sqrt{2}}{\sigma}\int_0^{-\frac{m\sqrt{2}}{\sigma}} e^{\frac{-u^2}{2}}du\right]$$

$$E(|t|) = \frac{1}{4\pi}\left[2\int_0^{+\infty} ue^{\frac{-u^2}{2}}du - \quad\text{term } E\right.$$
$$2\int_0^{-\frac{m\sqrt{2}}{\sigma}} ue^{\frac{-u^2}{2}}du - \quad\text{term } F$$
$$\left.\frac{2m\sqrt{2}}{\sigma}\int_0^{-\frac{m\sqrt{2}}{\sigma}} e^{\frac{-u^2}{2}}du\right] \quad\text{term } G$$

Development 4/5
Calculation of term E $$\int_0^{+\infty} ue^{\frac{-u^2}{2}}$$

tends towards 1 ⇔ the term E tends towards 2
Calculation of term F

Change of variable: $v = \frac{u^2}{2}$

We have then $dv = \frac{2u\,du}{2} = u\,du$ when $u = \frac{-m\sqrt{2}}{\sigma}$ $v = \frac{u^2}{2} = \frac{1}{2}\left(\frac{-m\sqrt{2}}{\sigma}\right)^2$
$= \frac{1}{2}\left(\frac{2m^2}{\sigma^2}\right)$
$= \frac{m^2}{\sigma^2}$ Term $F = -2\int_0^{-\frac{m\sqrt{2}}{\sigma}} ue^{\frac{-u^2}{2}}du$
$= -2\int_0^{\frac{m^2}{\sigma^2}} e^{-v}dv$ or $\int_0^x e^{-v}dv = 1 - e^{-x}$ Term $F = -2\left[1 - e^{\frac{-m^2}{\sigma^2}}\right]$ Calculation of term G
Change of variable by multiplying by $\sqrt{2\pi}\,\frac{1}{\sqrt{2\pi}}$ Term $G = -\frac{2m\sqrt{2}}{\sigma}\int_0^{\frac{m\sqrt{2}}{\sigma}} e^{\frac{-u^2}{2}}du$
$= -\frac{2m\sqrt{2}}{\sigma}\sqrt{2\pi}\int_0^{\frac{m\sqrt{2}}{\sigma}} e^{\frac{-u^2}{2}}du$
$= -\frac{4m\sqrt{\pi}}{\sigma}\left[\varphi\left(,\frac{-m\sqrt{2}}{\sigma},0,1\right) - \varphi(0,0,1)\right]$
$= -\frac{4m\sqrt{\pi}}{\sigma}\left[\varphi\left(,\frac{-m\sqrt{2}}{\sigma},0,1\right) - \frac{1}{2}\right]$ Term $G = -\frac{4m\sqrt{\pi}}{\sigma}\varphi\left(\frac{-m\sqrt{2}}{\sigma},0,1\right) + \frac{2m\sqrt{\pi}}{\sigma}$ Development 5/5

$$E(|t|) = \quad\text{term E}$$
$$\frac{1}{4\pi}\left[2 - 2\left[1 - e^{\frac{-m^2}{\sigma^2}}\right] - \frac{4m\sqrt{\pi}}{\sigma}\varphi\left(\frac{-m\sqrt{2}}{\sigma},0,1\right) + \frac{2m\sqrt{\pi}}{\sigma}\right]$$

$$E(|t|) = \frac{1}{4\pi}\left[2 - 2 + 2e^{\frac{-m^2}{\sigma^2}} - \frac{4m\sqrt{\pi}}{\sigma}\varphi\left(\frac{-m\sqrt{2}}{\sigma},0,1\right) + \frac{2m\sqrt{\pi}}{\sigma}\right] \quad\text{term F}$$

$$E(|t|) = \frac{1}{2\pi}e^{\frac{-m^2}{\sigma^2}} - \frac{m}{\sigma\sqrt{\pi}}\varphi\left(\frac{-m\sqrt{2}}{\sigma},0,1\right) + \frac{m}{2\sigma\sqrt{\pi}} \quad\text{term G}$$

3.E.3—Combined Mathematical Expectation of Variable Payment
3.E.3.A—Combination with Two Indexes $$E(|X| + |Y|) = \sum_{i;j}[|x_i| + |y_j|] \cdot k_{xi;yj}$$

where $k_{xi;\,yj}$ is the probability to have x and y; together $$= \sum_{i;j}[|x_i| + |y_j|] \cdot f_{xi} \cdot g_{yj}$$

where $f_{xi}$ is the probability to have $x_i$ and $g_{yj}$ is the probability to have $y_j$ because X and Y are supposed to be independent $$= \sum_{i;j}[|x_i| \cdot f_{xi} \cdot g_{yj} + |y_j| \cdot f_{xi} \cdot g_{yj}]$$
$$= \sum_{i;j}|x_i| \cdot f_{xi} \cdot g_{yj} + \sum_{i;j}|y_j| \cdot f_{xi} \cdot g_{yj}$$
$$= \sum_j g_{yj} \cdot \left[\sum_i |x_i| \cdot f_{xi}\right] + \sum_i f_{xi} \cdot \left[\sum_j |y_j| \cdot g_{yj}\right]$$
$$= \left[\sum_i |x_i| \cdot f_{xi}\right] \cdot \left[\sum_j g_{yj}\right] + \left[\sum_j |y_j| \cdot g_{yj}\right] \cdot \left[\sum_i f_{xi}\right]$$
$$= E(|X|) \cdot \sum_j g_{yj} + E(|Y|) \cdot \sum_i f_{xi}$$

where
$E(|X|)$ = mathematical expectations for index X
$E(|Y|)$ = mathematical expectations for index Y calculated using the formula 3-2, expressed in the hereabove paragraph
<<Methods and processes enabling the game organiser to calculate the risks/Elementary mathematical expectation of variable payment>> (3.E.2).
and $$\sum_i f_{xi} = \text{probability of forecast of an index } X$$

$$\sum_j g_{yj} = \text{probability of forecast of an index } Y$$

calculated using the formula 1-3, expressed in the hereabove paragraph <<Methods and processes enabling the game organiser to determine the probability law/subparagraph probability of winners existence>> (3.B.3).

3.E.3.B—Combination with Three Indexes

Using the same method:

$$E(|X|+|Y|+|Z|) =$$
$$E(|X|) \cdot \sum_j g_{yj} \cdot \sum_j l_{zk} + E(|Y|) \cdot \sum_j f_{xi} \cdot \sum_j l_{zk} + E(|Z|) \cdot \sum_j f_{xi} \cdot \sum_j g_{yj}$$

where
$E(|X|)$=mathematical expectations for index X
$E(|Y|)$=mathematical expectations for index Y
$E(|Z|)$=mathematical expectations for index Z
calculated using the formula 3-2, expressed in the hereabove paragraph <<Methods and processes enabling the game organiser to calculate the combinations/subparagraph probability of the couple (1 index, 3 days)>> (3.D.2).
and $$\sum_i f_{xi} = \text{probability of forecast of an index } X$$

$$\sum_j g_{yj} = \text{probability of forecast of an index } Y$$

$$\sum_k l_{zk} = \text{probability of forecast of an index } Z$$

calculated using the formula 1-3, expressed in the hereabove paragraph <<Methods and processes enabling the game organiser to determine the probability law/subparagraph probability of winners existence>> (3.B.3).

3.F—Methods and Processes Enabling the Game Organiser to Calculate the Steering Variables This part aims at expliciting the complementary elements of calculation concerning daily quotation of point value, sliding horizons optimisation, and correlation level of indexes.

3.F.1—Daily Quotation of Point Value

Quotation with three indexes:
Let
$VP_{t+1}$ be the point value quoted on t for t+1
$S_{1;t+1}$ be the previsional spread of index 1 on t+1
$S_{2;t+1}$ be the previsional spread of index 2 on t+1
$S_{3;t+1}$ be the previsional spread of index 3 on t+1
and K a constant to be parametered then $VP_{t+1} = K \cdot S_{t+1}$ where $S_{t+1} = \sum_{i=1}^{3} S_{i;t+1}$ Calculation of the spreads for each of the three indexes:
Let
$C_t$ represent the quotation at the close of the market on day t
p(t; m; σ.) the normal distribution law used
and
$S_{t+1}$ the previsional average spread of the index on t+1
$C_{target}$ the average target value of the quotation at the close of the market on day t+1 then $S_{t+1} = 4\sigma \cdot C_{target}$
$= 4\sigma \cdot (1+m)C_t$

Calculation of the parametered constant K:
Let
$E_t$=E(|X|+|Y|+|Z|) be the mathematical expectation of the points to pay for on t
$P_t$=$p_1 p_2 p_3$ be the probability of having winners on t
and L be the average gain amount on a base period of time $$\text{then } L = \frac{\sum_t Et \cdot VPt}{\sum_t Pt}$$

$$= \frac{\sum_t Et \cdot K \cdot St}{\sum_t Pt}$$

$$= \frac{\sum_t Et \cdot St}{\sum_t Pt}$$

$$\text{so } K = L \cdot \frac{\sum_t Pt}{\sum_t Et \cdot St}$$

3.F.2—Tolerance Margins

Let us consider the case where the game organiser agrees to pay for correct forecasts, those including a tolerance margin.

This case is irrelevant for forecasts required with the exact decimal portion.

For the forecasts which are required without the decimal portion, we have considered the following solution:
1—the tolerance margins are expressed in points, whether above or under the index
2—as long as tolerance margins are small, gradual reasoning is acceptable to estimate probabilities. The probability of forecast of the index is a good approximation of the other tolerated forecasts.

For example, a tolerance margin announced for <<one point>> corresponds to three acceptable forecasts $C_{t+1}$, ($C_{t+1}$+1), or ($C_{t+1}$−1).
Let
$p_1$ be the occurrence probability of the event <<forecast $C_{t+1}$>>
$p_2$ be the occurrence probability of the event <<forecast ($C_{t+1}$+1)>>

$p_3$ be the occurrence probability of the event <<forecast $(C_{t+1}-1)$>>

Then $p_1 \approx p_2 \approx p_3$
$P = p_1 + p_2 + p_3$
$\approx 3p_1$

4—Other Particular Embodiments of the Game, Using Similar Methods and Processes as in Parts 2 and 3 Hereabove.

Other particular embodiments of the game can be composed with three indexes, as in part 3 hereabove, but with other major American and worldwide indexes, namely:
  the Dow Jones Industrial Average, the Nasdaq Composite, and the S&P 500,
  the Dow Jones Industrial Average, the Eurostoxx 50, and the Nikkei 225.

More generally, the game can be composed with several indexes taken from the leading publicly known indexes in the world, namely:
  Americas: New York (DJ Ind, DJ Transport, DJ Services, S&P 500, S&P Gold, Nasdaq, Russell 2000, Wilshire 5000), Toronto (Composite), Buenos Aires (Merval), Mexico (Immex), Santiago (General), Sao Paulo (Bovespa),
  Asia: Tokyo (Nikkei 225, Topix), Shanghai (Shanghai B), Shenzhen (Shenzhen B), Hong Kong (Hang Seng), Singapore (Strait Times), Bangkok (Set 50), Seoul (Kospi 200), Kuala Lumpur (KLSE), Taipei (Weighted Index), Djakarta (Composite), Mumbai (BSE Dollex), Tel Aviv (Maof 25),
  Africa/Pacific: Sydney (General, Asx 20), Wellington (DJ NZ), Johannesburg (Industrial, Gold mines), Casablanca (Masi), Cairo
  PanEuropean Indexes: Euronext (Euronext 100, Next 150, Alternext Allshares,) Investir (Vm 100), Eurofirst (Eurofirst 80, Eurofirst 100), EPRA (Epra Zone Euro), DJ Stoxx (Euro 50, Europe 50, Europe Large, Euro Large), Eurotop (Eurotop 100, Eurotop 300), MSCI (Msci Euro Index, Msci Pan-Euro),
  Zone Euro Indexes: Amsterdam (Aex), Brussels (Bel 20, General), Dublin (Iseq Overall), Frankfurt (X-Dax-30), Lisboa (Psi 20 Index), Madrid (Ibex 35, General), Milano (Mibtel, Mib 30), Paris (Cac 40, Next 20, Mid 100, Small 90, Mid&Small 190, Itcac 20), Vienna (Atx), Helsinki (Hex Index),
  Out of Zone Euro Indexes: Budapest (Bux), Copenhagen (Hfx), London (FTSE 100, FTSE 250, Gold Mines), Moscow (RTS Dollar), Oslo (Obx Industrial), Prag (Px 50), Stockholm (Omx), Warsaw (Wg 20), Zurich (SMI),
  Morgan Stanley Capital International geographical indexes, wether Global, regional or per country,
  Dow Jones sectorial indexes,
  ICB sectorial indexes.

Other particular embodiments of the game can be composed with several securities publicly listed on the markets. This includes namely stocks. This includes namely all securities publicly listed on the following markets:
  NYSE (New York Stock Exchange)
  Nasdaq
  Amex
  Euronext
  LSE (London Stock Exchange)
  LIFFE
  Tokyo Stock Exchange
  Hong Kong Stock Exchange.

5—Methods and Processes Enabling a Financial Operator to Use the Preceeding Methods and Processes Exposed in Order to Distribute Financial Products.

In the following part, let us consider a financial offer of a product based on the same characteristics as those already described for the game offer, but where the products are sold to speculators as very high leveraged financial options.

Preceeding methods and processes already exposed can then be read with a financial operator point of view i.e. following terms should be interpreted by a reader:
  game organiser can be read as financial operator,
  bet can be read as option, or dot option,
  combined bet can be read as multi-assets option.

Options are be subscribed online, exactly the same way bets are taken in previous descriptions.

What is proposed is to sell all options at a unique price, for instance one dollar.

What is also proposed is that the value point system is the same, except that value point can be quoted another way in order to take the options unit price into account.

The following method can be used:
Let
  $E_t$ be the mathematical expectation of the points to pay for on t,
  P be the fixed unit selling price of an option (for instance expressed in dollars),
  VP be the point value (for instance expressed in dollars),
Then, on average for the financial operator, the average income equals the average payment:

$$P = VP \times E_t$$
$$VP = P \times \frac{1}{E_t}$$

Notes:
In the case of a single dot option, $E_t = E(|X|)$
In the case of a multi-assets option with three referring dot options, $E_t = E(|X|+|Y|+|Z|)$ 6—Methods and Processes Enabling a Financial Operator to Provide a Multi-Assets Option.

Existing options (or warrants), whatever their directions (long or short, calls or puts) are one asset backed financial securities. The displayed process consists in backing securities to two or several assets. The backing assets may be stocks, bonds, raw materials, currencies or indexes representing groups of stocks, bonds, raw materials, currencies. So the exercise condition of the new security must lie together on two or several assets. The process comprises a method for calculating the price of the new security at start by deriving it from the prices of the backing assets and of their corresponding direct options.

The process is new for it leads to the creation of more complex securities than the existing options (or warrants) as their prices evolve in function of several assets. But these kind of securities are not a juxtaposition of several existing securities. To hold these types of securities is not equivalent to the possession of several separate existing securities. Indeed, if asset A and asset B are different, the value (so the cost) of an option on A and B joined assets is always inferior to the sum of the values of the corresponding options on A and B distinctly considered assets.

We have the relations:

Value of option (A, B)<(value of option A+Value of option B)

Value of option (A, B, . . . , N)<(Value of option A+Value of option B+ . . . +Value of option N)

Indeed, the option on A and B assets can be exercised only if the conditions on assets A and B are both satisfied. Whereas the detention of two similar options separately on asset A and on asset B enables the exercise of option A if the A condition is satisfied, including the case where the B condition is not and enables likewise the exercise of option B if the B condition is satisfied, including the case where condition A is not.

Thus the following table is built according to the different cases with two assets.

| Condition A | Condition B | Option (A, B) | Option A | Option B |
|---|---|---|---|---|
| Satisfied | Satisfied | Exercisable | Exercisable | Exercisable |
| Satisfied | Unsatisfied | Non-exercisable | Exercisable | Non-exercisable |
| Unsatisfied | Satisfied | Non-exercisable | Non-exercisable | Exercisable |
| Unsatisfied | Unsatisfied | Non-exercisable | Non-exercisable | Non-exercisable |

We can see in the table that, as option (A,B) is just satisfied in one case upon four, it is of less value than the addition of option A and option B where at least one condition is satisfied in three cases.

How to accurately evaluate the option (A, B) price at its creation, for instance, by a market-keeper or a bank?

By applying methods of probability analysis, already exposed in the present application in the part devoted to the play to determine the costs on bets upon several assets, we can formulate a method to evaluate option (A,B) considering the values of the corresponding options A and B.

The values of options A and B are supposed to be known. They may be quoted values on financial markets or values resulting from the use of existing options evaluating methods (upon an unique asset), as for instance the Black & Scholes method.

Considering VA the value of asset A and VB the value of asset B.

Considering PA the value of option A and PB the value of option B.

Considering P(A,B) the value of option (A, B) backed to the asset (A+B) whose value is VA+VB.

One call <<Level effect>> of an option the existing ratio between the asset value V and the option price P.

Considering: LA=VA/PA et LB=VB/PB

We have also: L(A,B)=(VA+VB)/P(A,B)

The level effect is always higher than 1 at the time of the option creation by the market-keeper or the bank. Indeed, the characteristic interest of this type of security is to enable an investor to take market positions equivalent to an asset detention but with less of capital. Therefore options are created on this side of the exercise strike (value): below for a call, above for a put. Being "Out of Money" at the time of their creation, they have no "Intrinsic Value", only a "Time Value" of opportunity, much lower than that of the underlying asset. So at the creation: P<V.

Considering the inverses 1/L of the Level Effects
1/LA=PA/VA
1/LB=PB/VB
1/:L(A,B)=P(A,B)/(VA+VB)

We have the relation: P<V so P:/V<1 thus 1/L<1

And as the asset value and the option price at its creation are positive number by nature, we have: 0<1/L<1

The option price at its creation is the right price for the issuer and the buyer of the option. It can be considered that it is the financial risk measure taken by the issuer, which is proportional to the asset value. Thus: P=k V where k is a risk coefficient. As a matter of fact the inversed Level Effects hierarchy 1/L of options strictly reflects the hierarchy of their chances of being exercised.

We have: k=P/V thus k=1/L and therefore: 0<k<1

Therefore we can consider that the k coefficients as a whole form a probability distribution from 0 to 1, where k represents the risk taken by the issuer, ie the probability of the exercise of the option by the buyer.

Considering: Pr(A) the exercise probability of option A, we have: Pr(A)=PA/VA,

Considering: Pr(B) the exercise probability of option B, we have: Pr(B)=PB/VB,

Considering: Pr(A,B) the exercise probability of option (A,B) we have: Pr(A,B)=P(A,B)/(VA+VB).

By appliance of probabilities laws we have:

Pr(A, B)=Pr(A inter B) or probability that both option A and option B may be exercisable.

The probability of A inter B is equal to the probability of A multiplied by the conditional probability of B by reference to A.

And in the case where these events are independent, the conditional probability of B by reference to A is equal to the simple probability of B.

Thus: Pr(A inter B)=Pr(A)×Pr(B)
Pr(A,B)=k(A,B)=P(A,B)/V(A,B)=P(A,B)/(VA+VB)
So: P(A,B)=Pr(A,B)×(VA+VB)
P(A,B)=Pr(A inter B)×(VA+VB)
And if A and B are independent events:
P(A,B)=Pr(A)×Pr(B)×(VA+VB)
P(A,B)=(PA/VA)×(PB/VB)×(VA+VB)
P(A,B)=PA×PB×(VA+VB)/(VA×VB)

Thus, if the current prices of two assets A and B can be considered as evolving in an independent way, then the issue price of the multi-assets option (A,B) must be equal to the product of the prices of option A and option B, multiplied by the sum of the values of asset A and asset B and divided by the product of the values of asset A and asset B.

In case of an option backed to more than two assets two by two independent, we get in the same way by applying probability laws:
P(A, B, . . . N)=Pr(A inter B inter . . . N)×(VA+VB+N)
Pr(A inter B inter . . . N)=Pr(A)×Pr(B)×Pr(C)×Pr(N)
P(A, B, . . . N)=(P(A)/VA)×(P(B)/VB)×(P(N)/VN)×(VA+VB+ . . . VN)
P(A, B, . . . N)=PA×PB× . . . PN×(VA+VB+ . . . VN)/(VA×VB× . . . VN)

To check that the assets evolve two by two in independent ways, one can use statistical methods of correlation analysis among historical values series, for instance the regression method.

When the assets are strongly correlated, the multi-assets option has a minor economic interest as then the price of the multi-assets option cannot be significantly lower than that of the option backed on an unique asset. The previously exposed formula can be applied only to the pricing at their creation of options, the assets of which can be considered as statistically independent two by two.

Examples

1. Example of a Multi-Assets Option on Stock and Currency:

A foreign investor, holding stocks from an US company quoted on an US stock-exchange, ought to cover his investment against both an unfavourable movement of his dollar quoted stocks and an unfavourable movement of the dollar rate of exchange versus his own currency. These separated covers on stock and currency are today too expensive to be economically applied. But if in a recent period the correlation analysis shows that the evolutions of the stock quotes and that of the currency rates of exchange are statistically independent, then the investor may find advantage to buy a put of a multi-assets option, backed both on the stock and the currency, the cost of which is minor compared to the two separate covers.

2. Example of a Multi-Assets Option on Treasury Notes and on Currency:

Let us suppose that on a recent period the correlation analysis shows a negative correlation between the Treasury Notes quotes and those of the dollar versus an other currency. A foreign investor in Treasury Notes may consider that the two reverse movements are almost balanced. But he may want to cover his asset against a defavourable evolution in the same time of both the Notes quotes and the currency quotes. Then the investor may find advantage to buy a put of a multi-assets option, backed both on Treasury Notes and the currency, the cost of which is minor compared to the two separate covers.

3. Example of a Multi-Assets Option on Different Stocks.

A domestic investor holds A stocks which are performing and correlated last months to the stock-exchange. This investor makes a short selling of B stocks badly performing and non-correlated with the market, so non-correlated with A stocks. To cover his whole position, the investor may buy at an advantageous price a multi-assets option backed both on A and B stocks and consisting of a put on A and a call on B.

We claim:

1. A method for a financial forecasting game, said method comprising: causing a processor to execute a plurality of instructions stored on at least one memory device to:
   (a) determine a first value T1,
   (b) determine a second value T2,
   (c) receive a first forecast from a player, the first forecast being associated with a first financial quote at a designated first time,
   (d) receive a second forecast from the player, the second forecast being associated with a second financial quote at a designated second time,
   (e) determine a first value of the first financial quote associated with the first forecast for the designated first time, wherein the determined first value of the first financial quote is equal to an actual value of the first financial quote at the designated first time,
   (f) determine a first value of the second financial quote associated with the second forecast for the designated second time, wherein the determined first value of the second financial quote is equal to an actual value of the second financial quote at the designated second time,
   (g) determine if the first forecast is acceptable, wherein the first forecast is acceptable when a value F1 is:
      (i) less than or equal to a value Q1 plus the value T1, and
      (ii) greater than or equal to the value Q1 minus the value T1,
   wherein the value F1 is mathematically calculated from the first forecast, and wherein the value Q1 is mathematically calculated from the determined first value of the first financial quote associated with the first forecast for the designated first time,
   (h) determine if the second forecast is acceptable, wherein the second forecast is acceptable when a value F2 is:
      (i) less than or equal to a value Q2 plus the value T2, and
      (ii) greater than or equal to the value Q2 minus the value T2,
   wherein the value F2 is mathematically calculated from the second forecast, and wherein the value Q2 is mathematically calculated from the determined first value of the second financial quote associated with the second forecast for the designated second time,
   (i) determine a set including the first forecast and the second forecast,
   (j) determine if the set is associated with a prize having a prize value, wherein the set is associated with the prize when (i) the first forecast is acceptable and (ii) the second forecast is acceptable, and
   (k) if the determination is that the set is associated with the prize:
      (i) determine a second value of the first financial quote associated with the first forecast for a designated first previous time, wherein the determined second value of the first financial quote is equal to an actual value of the first financial quote at the designated first previous time,
      (ii) determine a second value of the second financial quote associated with the second forecast for a designated second previous time, wherein the determined second value of the second financial quote is equal to an actual value of the second financial quote at the designated second previous time,
      (iii) determine the prize value of the prize based on:
         (A) the determined first value of the first financial quote associated with the first forecast for the designated first time,
         (B) the determined second value of the first financial quote associated with the first forecast for the designated first previous time,
         (C) the determined first value of the second financial quote associated with the second forecast for the designated second time, and
         (D) the determined second value of the second financial quote associated with the second forecast for the designated second previous time, and
      (iv) provide the prize having the determined prize value to the player.

2. The method of claim 1, wherein (a) the value Q1 is equal to the determined first value of the first financial quote associated with the first forecast for the designated first time, or (b) the value Q2 is equal to the determined first value of the second financial quote associated with the second forecast for the designated second time.

3. The method of claim 1, wherein:
   (a) the value Q1 is equal to at least one of:
      (i) the determined first value of the first financial quote associated with the first forecast for the designated first time,
      (ii) an integer part of the determined first value of the first financial quote associated with the first forecast for the designated first time, and
      (iii) a rounded value of the determined first value of the first financial quote associated with the first forecast for the designated first time, and (b) the value Q2 is equal to at least one of:
  (i) the determined first value of the second financial quote associated with the second forecast for the designated second time,
  (ii) an integer part of the determined first value of the second financial quote associated with the second forecast for the designated second time, and
  (iii) a rounded value of the determined first value of the second financial quote associated with the second forecast for the designated second time.

4. The method of claim 1, which includes: causing the processor to execute a plurality of instructions stored on the at least one memory device to:
  (a) determine a first probability associated with the first forecast,
  (b) determine a second probability associated with the second forecast,
  (c) determine a third probability associated with the set, wherein the third probability is based on:
    (i) the determined first probability associated with the first forecast, and
    (ii) the determined second probability associated with the second forecast, and
  (d) if at least one of the value T1 and the value T2 change, change the third probability associated with the set based on the at least one of: (i) the value of T1, and (ii) the value of T2.

5. The method of claim 1, which includes: causing the processor to execute a plurality of instructions stored on the at least one memory device to:
  (a) determine at least one point value Vp before the first forecast and the second forecast are received from the player, and
  (b) determine the prize value based on the at least one point value Vp.

6. A method for a financial forecasting game, said method comprising: causing a processor to execute a plurality of instructions stored on at least one memory device to:
  (a) receive a first forecast from a player, the first forecast being associated with a designated first financial quote at a designated first time,
  (b) receive a second forecast from the player, the second forecast being associated with a designated second financial quote at a designated second time,
  (c) determine a first value of the designated first financial quote associated with the first forecast for the designated first time, wherein the determined first value of the first financial quote is equal to an actual value of the first financial quote at the designated first time,
  (d) determine a first value of the designated second financial quote associated with the second forecast for the designated second time, wherein the determined first value of the second financial quote is equal to an actual value of the second financial quote at the designated second time,
  (e) determine if the first forecast is acceptable based on:
    (i) the determined first value of the designated first financial quote associated with the first forecast for the designated first time, and
    (ii) a predetermined first tolerance associated with the determined first value of the designated first financial quote,
  (f) determine if the second forecast is acceptable based on:
    (i) the determined first value of the designated second financial quote associated with the second forecast for the designated second time, and
    (ii) a predetermined second tolerance associated with the determined first value of the designated second financial quote,
  (g) determine a set including the first forecast and the second forecast,
  (h) determine if the set is associated with a prize having a prize value, wherein the set is associated with the prize when (i) the first forecast is acceptable and (ii) the second forecast is acceptable, and
  (i) if the determination is that the set is associated with the prize:
    (i) determine a second value of the designated first financial quote associated with the first forecast for a designated first previous time, wherein the determined second value of the designated first financial quote is equal to an actual value of the designated first financial quote at the designated first previous time,
    (ii) determine a second value of the designated second financial quote associated with the second forecast for a designated second previous time, wherein the determined second value of the designated second financial quote is equal to an actual value of the designated second financial quote at the designated second previous time,
    (iii) determine the prize value of the prize based on:
      (A) the determined first value of the designated first financial quote associated with the first forecast for the designated first time,
      (B) the determined second value of the designated first financial quote associated with the first forecast for the designated first previous time,
      (C) the determined first value of the designated second financial quote associated with the second forecast for the designated second time, and
      (D) the determined second value of the designated second financial quote associated with the second forecast for the designated second previous time, and
    (iv) provide the prize having the determined prize value to the player.

7. The method of claim 6, which includes: causing the processor to execute a plurality of instructions stored on the at least one memory device to:
  (a) receive a third forecast from a second player, the third forecast being associated with a designated third financial quote at a designated third time,
  (b) receive a fourth forecast from the second player, the fourth forecast being associated with a designated fourth financial quote at a designated fourth time,
  (c) determine a first value of the designated third financial quote associated with the third forecast for the designated third time, wherein the determined first value of the designated third financial quote is equal to an actual value of the designated third financial quote at the designated third time,
  (d) determine a first value of the designated fourth financial quote associated with the fourth forecast for the designated fourth time, wherein the determined first value of the designated fourth financial quote is equal to an actual value of the designated fourth financial quote at the designated fourth time,
  (e) determine if the third forecast is acceptable based on:
    (i) the determined first value of the designated third financial quote associated with the third forecast for the designated third time, and

33

(ii) a predetermined third tolerance associated with the determined first value of the designated third financial quote,
 (f) determine if the fourth forecast is acceptable based on:
  (i) the determined first value of the designated fourth financial quote associated with the fourth forecast for the designated fourth time, and
  (ii) a predetermined fourth tolerance associated with the determined first value of the designated fourth financial quote,
 (g) determine a second set including the third forecast and the fourth forecast,
 (h) determine if the second set is associated with a second prize having a second prize value, wherein the second set is associated with the second prize when (i) the third forecast is acceptable and (ii) the fourth forecast is acceptable, and
 (i) if the determination is that the second set is associated with the second prize, provide the second prize having the second prize value to the second player.

8. The method of claim 7, wherein at least one of the designated first and second financial quotes at the designated times of the set for the player is the same as at least one of the designated third and fourth financial quotes at the designated times of the second set for the second player.

9. The method of claim 7, wherein at least one of the designated first and second financial quotes at the designated times of the set for the player is different from at least one of the designated third and fourth financial quotes at the designated times of the second set for the second player.

10. The method of claim 7, which includes: causing the processor to execute a plurality of instructions stored on the at least one memory device to:
 (a) determine a third set including the first forecast and the third forecast,
 (b) determine if the third set is associated with a third prize having a third prize value, wherein the third set is associated with the third prize when (i) the first forecast is acceptable and (ii) the third forecast is acceptable, and
 (c) if the determination is that the third set is associated with the third prize, provide the third prize having the third prize value to the player and the second player.

11. The method of claim 7, which includes: causing the processor to execute a plurality of instructions stored on the at least one memory device to:
 (a) determine a ranking for each of the set and the second set,
 (b) determine if the set is associated with the prize based on the ranking for the set, and
 (c) determine if the second set is associated with the second prize based on the ranking for the second set.

12. The method of claim 11, which includes: causing the processor to execute a plurality of instructions stored on the at least one memory device to:
 (i) determine the ranking of the set based on:
  (a) each of the forecasts of the first set and, for each of the forecasts of the first set, whether that forecast is acceptable, and
  (b) a date and a time at which each forecast of the first set was received,
 (ii) determine the ranking of the second set based on:
  (a) each of the forecasts of the second set and, for each of the forecasts of the second set, whether that forecast is acceptable, and
  (b) a date and a time at which each forecast of the second set was received.

34

13. The method of claim 11, which includes: causing the processor to execute a plurality of instructions stored on the at least one memory device to:
 (i) determine the ranking of the set based on:
  (a) the absolute value of the difference between: (i) the first forecast, and (ii) the determined first value of the designated first financial quote for the designated first time, and
  (b) the absolute value of the difference between: (i) the second forecast, and (ii) the determined first value of the designated second financial quote for the designated second time, and
 (ii) determine the ranking of the second set based on:
  (a) the absolute value of the difference between: (i) the third forecast, and (ii) the determined first value of the designated third financial quote for the designated third time, and
  (b) the absolute value of the difference between: (i) the fourth forecast, and (ii) the determined first value of the designated fourth financial quote for the designated fourth time.

14. The method of claim 7, which includes: if the determination is that the second set is associated with the second prize, causing the processor to execute a plurality of instructions stored on the at least one memory device to:
 (a) determine a second value of the designated third financial quote associated with the third forecast for a designated third previous time, wherein the determined second value of the designated third financial quote is equal to an actual value of the designated third financial quote at the designated third previous time,
 (b) determine a second value of the designated fourth financial quote associated with the fourth forecast for a designated fourth previous time, wherein the determined second value of the designated fourth financial quote is equal to an actual value of the designated fourth financial quote at the designated fourth previous time, and
 (c) determine the second prize value based on:
  (i) the determined first value of the designated third financial quote associated with the third forecast for the designated third time,
  (ii) the determined second value of the designated third financial quote associated with the third forecast for the designated third previous time,
  (iii) the determined first value of the designated fourth financial quote associated with the fourth forecast for the designated fourth time, and
  (iv) the determined second value of the designated fourth financial quote associated with the fourth forecast for the designated fourth previous time.

15. The method of claim 7, which includes: causing the processor to execute a plurality of instructions stored on the at least one memory device to receive a wager from the second player.

16. The method of claim 15, wherein (i) the wager is greater than zero, or (ii) the wager is equal to zero.

17. The method of claim 6, wherein at least one of: (i) the predetermined first tolerance is a value equal to zero, and (ii) the predetermined second tolerance is a value equal to zero.

18. The method of claim 6, wherein (i) the designated first time is different from the designated second time, or (ii) the designated first time is the same as the designated second time.

19. The method of claim 6, which includes: causing the processor to execute a plurality of instructions stored on the at least one memory device to change at least one of:

(a) the determined first value of the designated first financial quote associated with the first forecast for the designated first time to be equal to at least one of:
  (i) an integer part of the actual value of the designated first financial quote associated with the first forecast at the designated first time, and
  (ii) a rounded value of the actual value of the designated first financial quote associated with the first forecast at the designated first time, and
(b) the determined first value of the designated second financial quote associated with the second forecast for the designated second time to be equal to at least one of:
  (i) an integer part of the actual value of the designated second financial quote associated with the second forecast at the designated second time, and
  (ii) a rounded value of the actual value of the designated second financial quote associated with the second forecast at the designated second time.

20. The method of claim 6, which includes: causing the processor to execute a plurality of instructions stored on the at least one memory device to receive a wager from the player.

21. The method of claim 20, wherein the wager is equal to zero.

22. The method of claim 20, wherein the wager is greater than zero.

23. The method of claim 6, which includes: causing the processor to execute a plurality of instructions stored on the at least one memory device to:
  (a) determine a first probability associated with the first forecast,
  (b) determine a second probability associated with the second forecast,
  (c) determine a third probability associated with the set, wherein the third probability is based on:
    (i) the determined first probability associated with the first forecast, and
    (ii) the determined second probability associated with the second forecast, and
  (d) if at least one of the predetermined first tolerance and the predetermined second tolerance change, change the third probability associated with the set based on the at least one of: (i) the predetermined first tolerance, and (ii) and the predetermined second tolerance.

24. The method of claim 6, which includes: causing the processor to execute a plurality of instructions stored on the at least one memory device to:
  (a) determine at least one point value Vp before the first forecast and the second forecast are received from the player, and
  (b) determine the prize value based on the at least one point value Vp.

25. The method of claim 6, which includes: causing the processor to execute a plurality of instructions stored on the at least one memory device to:
  (a) determine at least one point value Vp, and
  (b) if the determination is to provide the prize to the player:
    (i) determine a V2A value mathematically calculated from the determined first value of the designated first financial quote for the designated first time,
    (ii) determine a V1A value mathematically calculated from the determined second value of the designated first financial quote for the designated first previous time,
    (iii) determine a first variation Delta1 mathematically calculated from: (a) the value V2A, and (b) the value V1A,
    (iv) determine a V2B value mathematically calculated from the determined first value of the designated second financial quote for the designated second time,
    (v) determine a V1B value mathematically calculated from the determined second value of the designated second financial quote for the designated second previous time,
    (vi) determine a second variation Delta2 mathematically calculated from: (a) the value V2B, and (b) the value V1B, and
    (vii) determine the prize value of the prize to be provided to the player mathematically calculated from: (a) the at least one determined point value Vp, (b) the first variation Delta1, and (c) the second variation Delta2.

26. A game system comprising:
(i) at least one input device,
(ii) at least one display device,
(iii) a processor, and
(iv) at least one memory device which stores a plurality of instructions which when executed by the processor, cause the processor to operate with the one at least display device and the one at least input device to:
  (a) determine a first value T1,
  (b) determine a second value T2,
  (c) receive a first forecast from a player, the first forecast being associated with a first financial quote at a designated first time,
  (d) receive a second forecast from the player, the second forecast being associated with a second financial quote at a designated second time,
  (e) determine a first value of the first financial quote associated with the first forecast for the designated first time, wherein the determined first value of the first financial quote is equal to an actual value of the first financial quote at the designated first time,
  (f) determine a first value of the second financial quote associated with the second forecast for the designated second time, wherein the determined first value of the second financial quote is equal to an actual value of the second financial quote at the designated second time,
  (g) determine if the first forecast is acceptable, wherein the first forecast is acceptable when a value F1 is:
    (i) less than or equal to a value Q1 plus the value T1, and
    (ii) greater than or equal to the value Q1 minus the value T1,
    wherein the value F1 is mathematically calculated from the first forecast, and wherein the value Q1 is mathematically calculated from the determined first value of the first financial quote associated with the first forecast for the designated first time,
  (h) determine if the second forecast is acceptable, wherein the second forecast is acceptable when a value F2 is:
    (i) less than or equal to a value Q2 plus the value T2, and
    (ii) greater than or equal to the value Q2 minus the value T2,
    wherein the value F2 is mathematically calculated from the second forecast, and wherein the value Q2 is mathematically calculated from the determined first value of the second financial quote associated with the second forecast for the designated second time,
  (i) determine a set including the first forecast and the second forecast,
  (j) determine if the set is associated with a prize having a prize value, wherein the set is associated with the prize when (i) the first forecast is acceptable and (ii) the second forecast is acceptable, and (k) if the determination is that the set is associated with the prize:
  (i) determine a second value of the first financial quote associated with the first forecast for a designated first previous time, wherein the determined second value of the first financial quote is equal to an actual value of the first financial quote at the designated first previous time,
  (ii) determine a second value of the second financial quote associated with the second forecast for a designated second previous time, wherein the determined second value of the second financial quote is equal to an actual value of the second financial quote at the designated second previous time,
  (iii) determine the prize value of the prize based on:
    (A) the determined first value of the first financial quote associated with the first forecast for the designated first time,
    (B) the determined second value of the first financial quote associated with the first forecast for the designated first previous time,
    (C) the determined first value of the second financial quote associated with the second forecast for the designated second time, and
    (D) the determined second value of the second financial quote associated with the second forecast for the designated second previous time, and
  (iv) provide the prize having the determined prize value to the player.

27. A game system comprising:
(i) at least one input device,
(ii) at least one display device,
(iii) a processor, and
(iv) at least one memory device which stores a plurality of instructions which when executed by the processor, cause the processor to operate with the one at least display device and the one at least input device to:
  (a) receive a first forecast from a player, the first forecast being associated with a designated first financial quote at a designated first time,
  (b) receive a second forecast from the player, the second forecast being associated with a designated second financial quote at a designated second time,
  (c) determine a first value of the designated first financial quote associated with the first forecast for the designated first time, wherein the determined first value of the first financial quote is equal to an actual value of the first financial quote at the designated first time,
  (d) determine a first value of the designated second financial quote associated with the second forecast for the designated second time, wherein the determined first value of the second financial quote is equal to an actual value of the second financial quote at the designated second time,
  (e) determine if the first forecast is acceptable based on:
    (i) the determined first value of the designated first financial quote associated with the first forecast for the designated first time, and
    (ii) a predetermined first tolerance associated with the determined first value of the designated first financial quote,
  (f) determine if the second forecast is acceptable based on:
    (i) the determined first value of the designated second financial quote associated with the second forecast for the designated second time, and
    (ii) a predetermined second tolerance associated with the determined first value of the designated second financial quote,
  (g) determine a set including the first forecast and the second forecast,
  (h) determine if the set is associated with a prize having a prize value, wherein the set is associated with the prize when (i) the first forecast is acceptable and (ii) the second forecast is acceptable, and
  (i) if the determination is that the set is associated with the prize:
    (i) determine a second value of the designated first financial quote associated with the first forecast for a designated first previous time, wherein the determined second value of the designated first financial quote is equal to an actual value of the designated first financial quote at the designated first previous time,
    (ii) determine a second value of the designated second financial quote associated with the second forecast for a designated second previous time, wherein the determined second value of the designated second financial quote is equal to an actual value of the designated second financial quote at the designated second previous time,
    (iii) determine the prize value of the prize based on:
      (A) the determined first value of the designated first financial quote associated with the first forecast for the designated first time,
      (B) the determined second value of the designated first financial quote associated with the first forecast for the designated first previous time,
      (C) the determined first value of the designated second financial quote associated with the second forecast for the designated second time, and
      (D) the determined second value of the designated second financial quote associated with the second forecast for the designated second previous time, and
    (iv) provide the prize having the determined prize value to the player.

28. A method for a financial forecasting game, said method comprising: causing a processor to execute a plurality of instructions stored on at least one memory device to:
  (a) at a first point in time:
    (i) receive a first forecast from a player, the first forecast being associated with a designated first financial quote at a designated first time, and
    (ii) receive a second forecast from the player, the second forecast being associated with a designated second financial quote at a designated second time,
  (b) after receiving the first forecast and the second forecast from the player:
    (i) determine a first value of the designated first financial quote associated with the first forecast for the designated first time, wherein the determined first value of the designated first financial quote is equal to an actual value of the designated first financial quote at the designated first time, and
    (ii) determine a first value of the designated second financial quote associated with the second forecast for the designated second time, wherein the determined first value of the designated second financial quote is equal to an actual value of the designated second financial quote at the designated second time,
  (c) determine if the first forecast is acceptable based on:
    (i) the determined first value of the designated first financial quote associated with the first forecast for the designated first time, and

39

(ii) a predetermined first tolerance associated with the determined first value of the designated first financial quote, (d) determine if the second forecast is acceptable based on:
  (i) the determined first value of the designated second financial quote associated with the second forecast for the designated second time, and
  (ii) a predetermined second tolerance associated with the determined first value of the designated second financial quote, (e) determine a set including the first forecast and the second forecast, (f) determine if the set is associated with a prize having a prize value, wherein the set is associated with the prize when (i) the first forecast is acceptable and (ii) the second forecast is acceptable, and (g) if the determination is that the set is associated with the prize:
  (i) determine a second value of the designated first financial quote associated with the first forecast for a designated first previous time, wherein the determined second value of the designated first financial quote is equal to an actual value of the designated first financial quote at the designated first previous time,
  (ii) determine a second value of the designated second financial quote associated with the second forecast for a designated second previous time, wherein the determined second value of the designated second financial quote is equal to an actual value of the designated second financial quote at the designated second previous time,
  (iii) determine the prize value of the prize based on:
    (A) the determined first value of the designated first financial quote associated with the first forecast for the designated first time,
    (B) the determined second value of the designated first financial quote associated with the first forecast for the designated first previous time,
    (C) the determined first value of the designated second financial quote associated with the second forecast for the designated second time, and
    (D) the determined second value of the designated second financial quote associated with the second forecast for the designated second previous time, and
  (iv) provide the prize having the determined prize value to the player.

29. The method of claim 28, which includes: causing a processor to execute a plurality of instructions stored on the at least one memory device to:
  (a) at a second different point in time:
    (i) receive a third forecast from the player, the third forecast being associated with a designated third financial quote at a designated third time, and
    (ii) receive a fourth forecast from the player, the fourth forecast being associated with a designated fourth financial quote at a designated fourth time,
  (b) after receiving the third forecast and the fourth forecast from the player:
    (i) determine a first value of the designated third financial quote associated with the third forecast for the designated third time, and
    (ii) determine a first value of the designated fourth financial quote associated with the fourth forecast for the designated fourth time,

40

(c) determine if the third forecast is acceptable based on:
    (i) the determined first value of the designated third financial quote associated with the third forecast for the designated third time, and
    (ii) a predetermined third tolerance associated with the determined first value of the designated third financial quote,
  (d) determine if the fourth forecast is acceptable based on:
    (i) the determined first value of the designated fourth financial quote associated with the fourth forecast for the designated fourth time, and
    (ii) a predetermined fourth tolerance associated with the determined first value of the designated fourth financial quote,
  (e) determine a second set including the third forecast and the fourth forecast,
  (f) determine if the second set is associated with a second prize having a second prize value, wherein the second set is associated with the second prize when (i) the third forecast is acceptable and (ii) the fourth forecast is acceptable, and
  (g) if the determination is that the second set is associated with the prize, provide the second prize having the second prize value to the player.

30. The method of claim 29, which includes: causing a processor to execute a plurality of instructions stored on the at least one memory device to:
  (a) determine a third set including the first forecast and the third forecast,
  (b) determine if the third set is associated with a third prize having a third prize value, wherein the third set is associated with the third prize when (i) the first forecast is acceptable and (ii) the third forecast is acceptable, and
  (c) if the determination is that the third set is associated with the third prize, provide the third prize having the third prize value to the player.

31. A game system comprising:
  (i) at least one input device,
  (ii) at least one display device,
  (iii) a processor, and
  (iv) at least one memory device which stores a plurality of instructions which when executed by the processor, cause the processor to operate with the at least one display device and the at least one input device to:
    (a) at a first point in time:
      (i) receive a first forecast from a player, the first forecast being associated with a designated first financial quote at a designated first time, and
      (ii) receive a second forecast from the player, the second forecast being associated with a designated second financial quote at a designated second time,
    (b) after receiving the first forecast and the second forecast from the player:
      (i) determine a first value of the designated first financial quote associated with the first forecast for the designated first time, wherein the determined first value of the designated first financial quote is equal to an actual value of the designated first financial quote at the designated first time, and
      (ii) determine a first value of the designated second financial quote associated with the second forecast for the designated second time, wherein the determined first value of the designated second financial quote is equal to an actual value of the designated second financial quote at the designated second time, (c) determine if the first forecast is acceptable based on:
　(i) the determined first value of the designated first financial quote associated with the first forecast for the designated first time, and
　(ii) a predetermined first tolerance associated with the determined first value of the designated first financial quote,
(d) determine if the second forecast is acceptable based on:
　(i) the determined first value of the designated second financial quote associated with the second forecast for the designated second time, and
　(ii) a predetermined second tolerance associated with the determined first value of the designated second financial quote,
(e) determine a set including the first forecast and the second forecast,
(f) determine if the set is associated with a prize having a prize value, wherein the set is associated with the prize when (i) the first forecast is acceptable and (ii) the second forecast is acceptable, and
(g) if the determination is that the set is associated with the prize:
　(i) determine a second value of the designated first financial quote associated with the first forecast for a designated first previous time, wherein the determined second value of the designated first financial quote is equal to an actual value of the designated first financial quote at the designated first previous time,
　(ii) determine a second value of the designated second financial quote associated with the second forecast for a designated second previous time, wherein the determined second value of the designated second financial quote is equal to an actual value of the designated second financial quote at the designated second previous time,
　(iii) determine the prize value of the prize based on:
　　(A) the determined first value of the designated first financial quote associated with the first forecast for the designated first time,
　　(B) the determined second value of the designated first financial quote associated with the first forecast for the designated first previous time,
　　(C) the determined first value of the designated second financial quote associated with the second forecast for the designated second time, and
　　(D) the determined second value of the designated second financial quote associated with the second forecast for the designated second previous time, and
　(iv) provide the prize having the determined prize value to the player.

32. The game system of claim 31, wherein the at least one memory device stores a plurality of instructions which when executed by the processor, cause the processor to operate with the at least one display device and the at least one input device to:
(a) at a second different point in time:
　(i) receive a third forecast from the player, the third forecast being associated with a designated third financial quote at a designated third time, and
　(ii) receive a fourth forecast from the player, the fourth forecast being associated with a designated fourth financial quote at a designated fourth time,
(b) after receiving the third forecast and the fourth forecast from the player:
　(i) determine a first value of the designated third financial quote associated with the third forecast for the designated third time, and
　(ii) determine a first value of the designated fourth financial quote associated with the fourth forecast for the designated fourth time,
(c) determine if the third forecast is acceptable based on:
　(i) the determined first value of the designated third financial quote associated with the third forecast for the designated third time, and
　(ii) a predetermined third tolerance associated with the determined first value of the designated third financial quote,
(d) determine if the fourth forecast is acceptable based on:
　(i) the determined first value of the designated fourth financial quote associated with the fourth forecast for the designated fourth time, and
　(ii) a predetermined fourth tolerance associated with the determined first value of the designated fourth financial quote,
(e) determine a second set including the third forecast and the fourth forecast,
(f) determine if the second set is associated with a second prize having a second prize value, wherein the second set is associated with the second prize when (i) the third forecast is acceptable and (ii) the fourth forecast is acceptable, and
(g) if the determination is that the second set is associated with the second prize, provide the second prize to the player.

33. The game system of claim 31, wherein the at least one memory device stores a plurality of instructions which when executed by the processor, cause the processor to operate with the at least one display device and the at least one input device to:
(a) at a second point in time:
　(i) receive a third forecast from a second player, the third forecast being associated with a designated third financial quote at a designated third time, and
　(ii) receive a fourth forecast from the second player, the fourth forecast being associated with a designated fourth financial quote at a designated fourth time,
(b) after receiving the third forecast and the fourth forecast from the second player:
　(i) determine a first value of the designated third financial quote associated with the third forecast for the designated third time, and
　(ii) determine a first value of the designated fourth financial quote associated with the fourth forecast for the designated fourth time,
(c) determine if the third forecast is acceptable based on:
　(i) the determined first value of the designated third financial quote associated with the third forecast for the designated third time, and
　(ii) a predetermined third tolerance associated with the determined first value of the designated third financial quote,
(d) determine if the fourth forecast is acceptable based on:
　(i) the determined first value of the designated fourth financial quote associated with the fourth forecast for the designated fourth time, and
　(ii) a predetermined fourth tolerance associated with the determined first value of the designated fourth financial quote,
(e) determine a second set including the third forecast and the fourth forecast, (f) determine if the second set is associated with a second prize having a second prize value, wherein the second set is associated with the second prize when (i) the third forecast is acceptable and (ii) the fourth forecast is acceptable, and (g) if the determination is that the second set is associated with the second prize, provide the second prize to the second player.

* * * * *